(12) United States Patent
Jun et al.

(10) Patent No.: US 10,999,774 B2
(45) Date of Patent: May 4, 2021

(54) METHOD AND APPARATUS FOR INTER-CELL LOAD DISTRIBUTION AND INTERFERENCE MITIGATION IN WIRELESS COMMUNICATION SYSTEM

(71) Applicant: Samsung Electronics Co., Ltd., Suwon-si (KR)

(72) Inventors: Byungwook Jun, Seoul (KR); Eunyong Kim, Yongin-si (KR); Seungjoo Maeng, Seongnam-si (KR); Namryul Jeon, Incheon (KR); Seunghee Han, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 234 days.

(21) Appl. No.: 15/114,626

(22) PCT Filed: Jan. 28, 2015

(86) PCT No.: PCT/KR2015/000879
§ 371 (c)(1),
(2) Date: Jul. 27, 2016

(87) PCT Pub. No.: WO2015/115784
PCT Pub. Date: Aug. 6, 2015

(65) Prior Publication Data
US 2016/0353347 A1 Dec. 1, 2016

Related U.S. Application Data

(60) Provisional application No. 61/932,513, filed on Jan. 28, 2014.

(30) Foreign Application Priority Data

Apr. 3, 2014 (KR) ........................ 10-2014-0040220

(51) Int. Cl.
*H04W 36/20* (2009.01)
*H04W 16/08* (2009.01)
(Continued)

(52) U.S. Cl.
CPC ........... *H04W 36/20* (2013.01); *H04L 1/1822* (2013.01); *H04W 16/04* (2013.01); *H04W 16/06* (2013.01);
(Continued)

(58) Field of Classification Search
CPC ..... H04W 36/20; H04W 16/04; H04W 16/06; H04W 16/08; H04W 24/02; H04W 24/10;
(Continued)

(56) References Cited

U.S. PATENT DOCUMENTS 9,615,366 B2  4/2017  Ohta et al.
10,039,095 B2  7/2018  Yoshizawa et al.
(Continued)

FOREIGN PATENT DOCUMENTS

CN  102792747 A  11/2012
CN  103096487 A  5/2013
(Continued)

OTHER PUBLICATIONS

Catt, Considering UE type for MLB Enhancement, 3GPP TSG RAN WG3 Meeting #79, R3-130047, Jan. 28-Feb. 1, 2013, Malta.
(Continued)

*Primary Examiner* — Christopher M Crutchfield
*Assistant Examiner* — Tito Q Pham
(74) *Attorney, Agent, or Firm* — Jefferson IP Law, LLP

(57) ABSTRACT

The present invention relates to a method and an apparatus for an inter-cell load distribution and interference mitigation in a wireless communication system, and the inter-cell load distribution method by a first base station in a heterogeneous network wireless communication system including the first
(Continued)

base station and a second base station for solving the above-described problem, comprises the steps of: setting a reserved area for the second base station so as to distribute an inter-cell load; and managing a terminal according to the reserved area.

15 Claims, 19 Drawing Sheets

(51) Int. Cl.
H04W 24/02 (2009.01)
H04W 28/02 (2009.01)
H04W 16/04 (2009.01)
H04W 16/06 (2009.01)
H04L 1/18 (2006.01)
H04W 68/00 (2009.01)
H04W 72/04 (2009.01)
H04W 74/08 (2009.01)
H04W 24/10 (2009.01)
H04W 28/08 (2009.01)
H04W 16/32 (2009.01)
H04W 36/04 (2009.01)
H04W 72/08 (2009.01)

(52) U.S. Cl.
CPC ........... *H04W 16/08* (2013.01); *H04W 24/02* (2013.01); *H04W 24/10* (2013.01); *H04W 28/0236* (2013.01); *H04W 28/08* (2013.01); *H04W 68/005* (2013.01); *H04W 72/042* (2013.01); *H04W 72/0413* (2013.01); *H04W 72/0446* (2013.01); *H04W 74/0833* (2013.01); *H04W 16/32* (2013.01); *H04W 36/04* (2013.01); *H04W 72/0486* (2013.01); *H04W 72/082* (2013.01)

(58) Field of Classification Search
CPC ............. H04W 28/0236; H04W 28/08; H04W 68/005; H04W 72/0413; H04W 72/042; H04W 72/0446; H04W 74/0833; H04W 16/32; H04W 36/04; H04W 72/0486; H04W 72/082; H04L 1/1822
See application file for complete search history.

(56) References Cited

U.S. PATENT DOCUMENTS

| | | | |
|---|---|---|---|
| 2009/0310561 A1* | 12/2009 | Grob | H04W 36/04 370/331 |
| 2011/0096660 A1* | 4/2011 | Ikeda | H04W 36/36 370/225 |
| 2011/0300807 A1 | 12/2011 | Kwun et al. | |
| 2012/0069756 A1* | 3/2012 | Ji | H04W 72/082 370/252 |
| 2012/0113843 A1 | 5/2012 | Watfa et al. | |
| 2012/0115541 A1 | 5/2012 | Suga | |
| 2012/0157082 A1 | 6/2012 | Pedersen et al. | |
| 2012/0190365 A1 | 7/2012 | Jeong et al. | |
| 2012/0307808 A1 | 12/2012 | Song et al. | |
| 2013/0044704 A1 | 2/2013 | Pang et al. | |
| 2013/0045694 A1 | 2/2013 | Nakamura | |
| 2013/0065599 A1 | 3/2013 | Chan et al. | |
| 2013/0084865 A1 | 4/2013 | Agrawal et al. | |
| 2013/0107798 A1 | 5/2013 | Gao et al. | |
| 2013/0109384 A1 | 5/2013 | Abe et al. | |
| 2013/0223393 A1 | 8/2013 | Jung et al. | |
| 2013/0229971 A1 | 9/2013 | Siomina et al. | |
| 2013/0229972 A1 | 9/2013 | Lee et al. | |
| 2013/0230014 A1* | 9/2013 | Kitaji | H04W 28/08 370/329 |
| 2013/0237233 A1* | 9/2013 | Radulescu | H04W 36/22 455/440 |
| 2013/0244664 A1* | 9/2013 | Song | H04W 36/0083 455/437 |
| 2013/0250764 A1 | 9/2013 | Vasudevan et al. | |
| 2013/0286906 A1 | 10/2013 | Seo et al. | |
| 2013/0343270 A1 | 12/2013 | Abe et al. | |
| 2014/0198659 A1* | 7/2014 | Vargas Bautista | H04W 28/08 370/236 |
| 2014/0198744 A1 | 7/2014 | Wang et al. | |
| 2014/0204861 A1 | 7/2014 | Tie et al. | |
| 2014/0254537 A1 | 9/2014 | Kim et al. | |
| 2014/0321434 A1 | 10/2014 | Gayde et al. | |
| 2014/0355470 A1 | 12/2014 | Nagata et al. | |
| 2014/0378135 A1 | 12/2014 | Koide | |
| 2015/0016374 A1 | 1/2015 | Liang et al. | |
| 2015/0029891 A1 | 1/2015 | Hwang et al. | |
| 2015/0031369 A1 | 1/2015 | Gunnarsson et al. | |
| 2015/0085767 A1 | 3/2015 | Einhaus et al. | |
| 2015/0119053 A1 | 4/2015 | Morimoto et al. | |
| 2015/0146622 A1 | 5/2015 | Ren et al. | |
| 2015/0146679 A1* | 5/2015 | Lindoff | H04J 11/0056 370/330 |
| 2015/0195068 A1* | 7/2015 | Kim | H04L 5/0094 370/329 |
| 2015/0195820 A1* | 7/2015 | Jung | H04L 5/0073 370/329 |
| 2015/0207596 A1 | 7/2015 | Kroener et al. | |
| 2015/0207601 A1* | 7/2015 | Kim | H04L 5/005 370/329 |
| 2015/0208410 A1 | 7/2015 | Koutsimanis et al. | |
| 2015/0223135 A1 | 8/2015 | Ratasuk et al. | |
| 2015/0296400 A1* | 10/2015 | Yang | H04W 72/0446 370/252 |
| 2015/0327093 A1* | 11/2015 | Yang | H04W 48/16 370/252 |
| 2015/0327225 A1 | 11/2015 | Xia et al. | |
| 2015/0350919 A1 | 12/2015 | Patel et al. | |
| 2015/0358100 A1* | 12/2015 | Jung | H04L 1/00 370/329 |
| 2015/0358887 A1 | 12/2015 | Xu et al. | |
| 2015/0358974 A1* | 12/2015 | Jung | H04W 72/048 370/329 |
| 2016/0066315 A1 | 3/2016 | Zhang | |
| 2016/0081112 A1 | 3/2016 | Dong et al. | |
| 2016/0233972 A1 | 8/2016 | Dinan | |
| 2017/0332394 A1 | 11/2017 | Lu | |

FOREIGN PATENT DOCUMENTS

| | | |
|---|---|---|
| CN | 103220678 A | 7/2013 |
| CN | 103281733 A | 9/2013 |
| CN | 103313312 A | 9/2013 |
| CN | 103369610 A | 10/2013 |
| CN | 103379574 A | 10/2013 |
| CN | 103686835 A | 3/2014 |
| EP | 2640124 A1 | 12/2013 |
| GB | 2532792 A | 6/2016 |
| JP | 2008-259046 A | 10/2008 |
| JP | 2011-035763 A | 2/2011 |
| JP | 2012-100220 A | 5/2012 |
| JP | 2013-526820 A | 6/2013 |
| KR | 10-2012-0049156 A | 5/2012 |
| WO | 2013/112090 A2 | 8/2013 |
| WO | 2013/115037 A1 | 8/2013 |
| WO | 2013/118567 A1 | 8/2013 |
| WO | 2013-141624 A1 | 9/2013 |
| WO | 2013152488 A1 | 10/2013 |
| WO | 2015/183575 A1 | 12/2015 |

OTHER PUBLICATIONS

Fujitsu, Son functions vs. LIE types in CRE scenarios, 3GPP TSG-RAN WG3 #79, R3-130056, Jan. 28-Feb. 1, 2013, Malta.
3rd Generation Partnership Project; Technical Specification Group Radio Access Network; Study on Small Cell enhancements for

(56) References Cited

OTHER PUBLICATIONS

E-UTRA and E-UTRAN; Higher layer aspects (Release 12), 3GPP TR 36.842 V12.0.0 (Dec. 2013), pp. 1-71.
Alcatel-Lucent, Connected mode paging enhancement, 3GPP TSG-RAN WG2 Meeting #77bis, R2-121839, Mar. 26-30, 2012, Jeju, Korea.
Interference Management in LTE-Advanced Heterogeneous Networks Using Almost Blank Subframes, Hisham El Shaer, Master's Degree Project, Stockholm, Sweden, XR-EE-SB 2012:006, Mar. 2012.
Nokia Siemens Networks, Enhanced Fast ABS Adaptation for Rel-12 Small Cell Scenario 1, 3GPP TSG RAN WG1 #73 Meeting, R1-132304, Fukuoka, Japan, May 11, 2013.
Japanese Office Action dated Jan. 4, 2019, issued in the Japanese application No. 2016-549125.
Chinese Office Action dated Feb. 15, 2019, issued in the Chinese application No. 201580006389.3.
Chinese Office Action dated Mar. 20, 2019, issued in the Chinese application No. 201580006367.7.
U.S. Office Action dated Jan. 11, 2019, issued in the U.S. Appl. No. 15/114,596.
U.S. Notice of Allowance dated Jan. 15, 2019, issued in the US. Appl. No. 15/114,589.
Korean Office Action dated Jan. 21, 2020, issued in Korean Application No. 10-2014-0040199.
Fujitsu, "MRO failure cases in CRE scenarios", 3GPP TSG-RAN WG3 #75bis, Mar. 26-30, 2012, San Jose Del Cabo, Mexico, R3-120637.
Chinese Rejection Decision dated Apr. 28, 2020, issued in Chinese Application No. 201580006389.3.
"3rd Generation Partnership Project; Technical Specification Group Radio Access Network; Network-Assisted Interference Cancellation and Suppression for LTE (Release 12)", 3GPP DRAFT; TR36. 866 FOR NAIC V0.6.0, Jan. 23, 2014, XP050751503, Retrieved from the Internet:URL: http://www.3gpp.org/ftp/tsg_ran/WG1_RL1/TSGR1_75/Docs/.
"3rd Generation Partnership Project; Technical Specification Group Radio Access Network; Study on Cell-specific Reference Signals (CRS) interference mitigation for homogenous deployments of LTE (Release 12)", 3GPP STANDARD; 3GPP TR 36.863, RAN WG4, V12.0.0, Jan. 6, 2014, pp. 1-61, XP050729381.
Ericsson et al: "Basic configuration for FeICIC demodulation/CSI Requirements", 3GPP Draft; R4-125645, RAN WG4 Oct. 12, 2012 (Oct. 12, 2012), XP050673258, Retrieved from the Internet:URL: http://www.3gpp.org/ftp/tsg_ran/WG4_Radio/TSGR4_64bis/Docs/.
3GPP Network-Assisted Interference Cancellation and Suppression for LTE, 3GPP TR 36.866 V1.0.0, Nov. 30, 2013.
European Summons to Attend Oral Proceedings dated Dec. 21, 2020, issued in European Application No. 15744012.4.
U.S. Office Action dated Dec. 23, 2020, issued in U.S. Appl. No. 16/725,440.
Chinese Notice of Allowance dated Dec. 30, 2020, issued in Chinese Application No. 201580006367.7.
Chinese Office Action dated Jan. 18, 2021, issued in Chinese Application No. 201580006389.3.

\* cited by examiner

FIG. 9
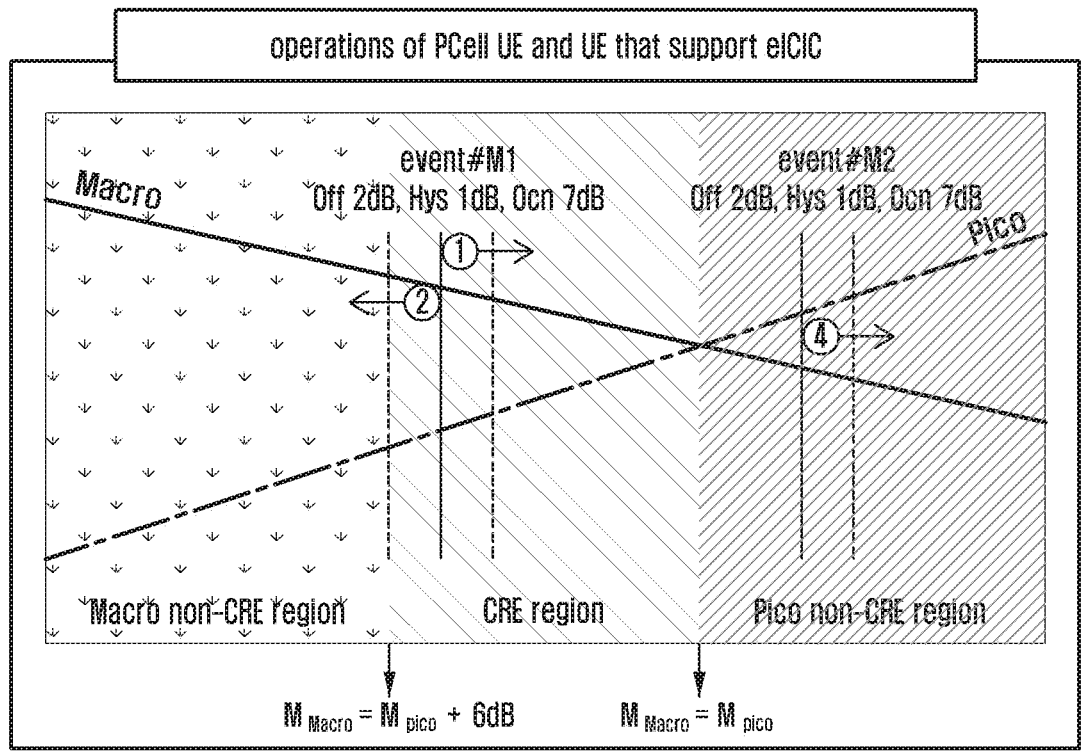
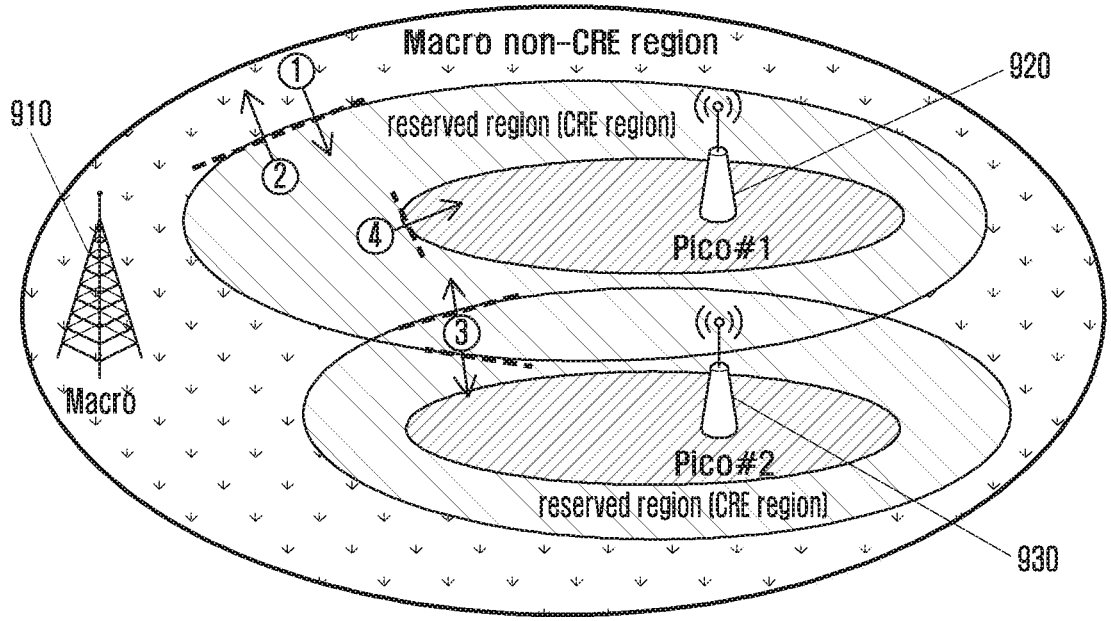

FIG. 10
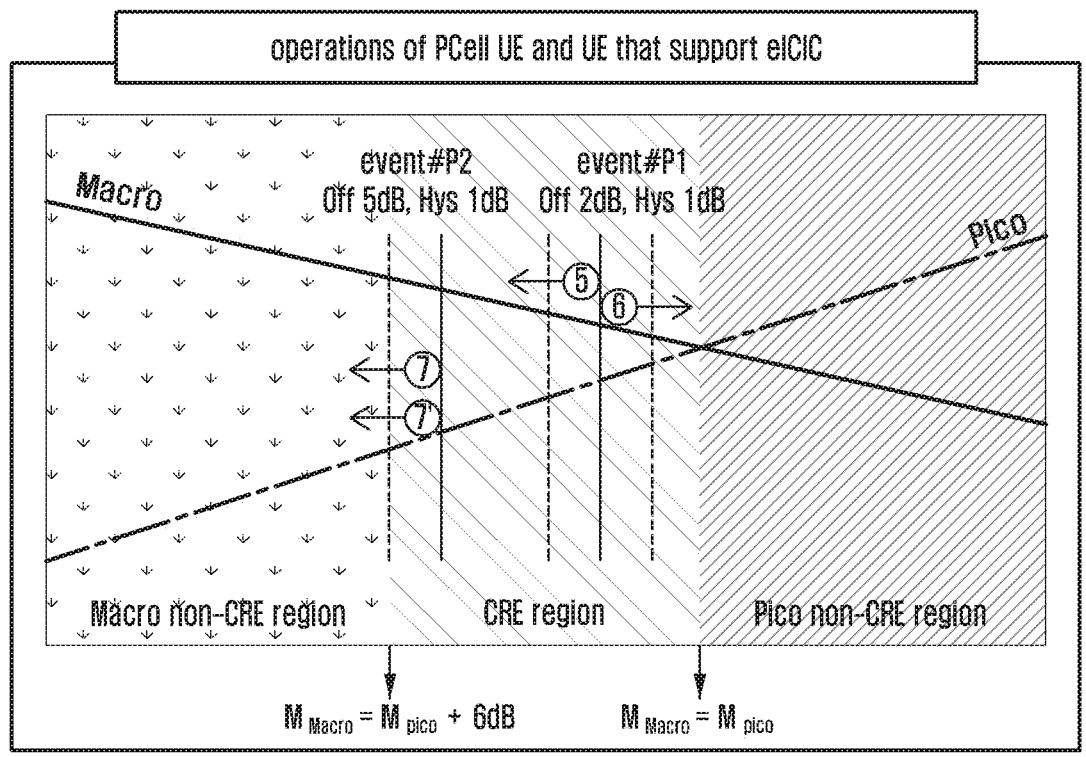
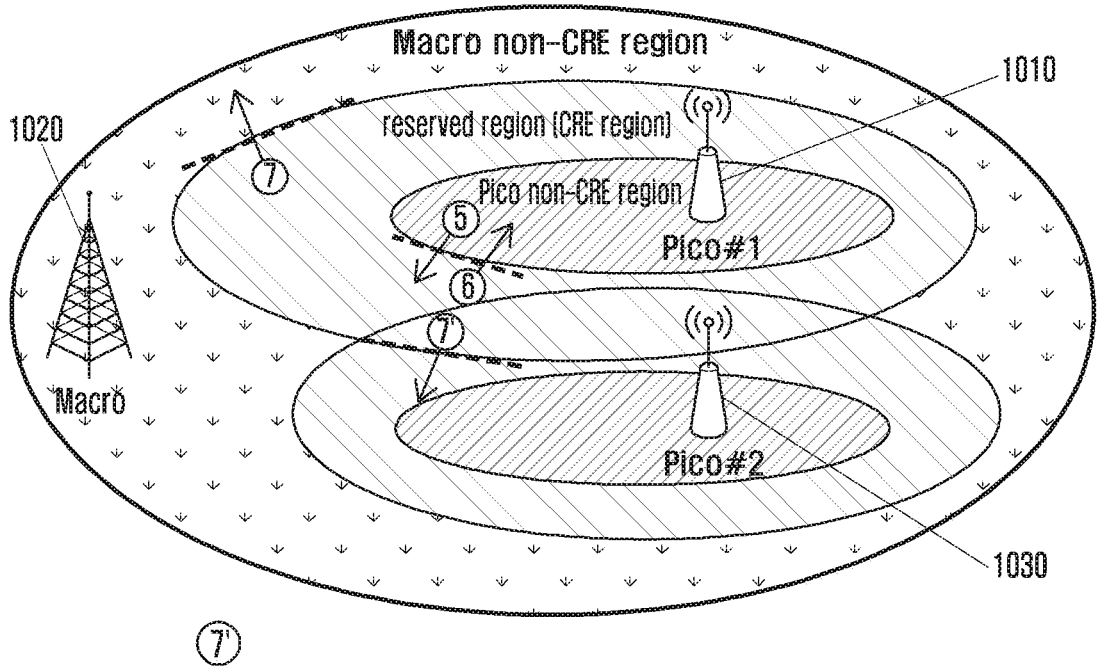

METHOD AND APPARATUS FOR INTER-CELL LOAD DISTRIBUTION AND INTERFERENCE MITIGATION IN WIRELESS COMMUNICATION SYSTEM

TECHNICAL FIELD

The present invention relates to wireless communication systems, and more particularly, to a method and apparatus for inter-cell load balancing and inter-cell interference mitigation in a wireless communication system of a heterogeneous network (HetNet).

BACKGROUND ART

Mobile communication systems have been developed to provide a voice service to users while they are moving. In recent years, mobile communication systems have been developed to provide data services at a high speed. With the increase in services for users, mobile communication systems need more system resources. Mobile communication systems need to be advanced as users demand services at a higher speed.

In order to comply with users' demands, Long Term Evolution (LTE) that has been developed as a next generation communication system is being standardized in the 3$^{rd}$ Generation Partnership Project (3GPP). LTE is a technology to implement high speed packet-based communication of a transmission rate of Maximum 100 Mbps. To this end, various proposals have been discussed. As an example, a scheme has been proposed to reduce the number of nodes on communication paths by simplifying network architecture. Another scheme has been proposed to apply wireless protocols to wireless channels as close as possible.

In recent years, the standardization for Time-Domain Inter-Cell Interference Coordination has been in progress. Therefore, eNBs need to effectively manage UE.

DISCLOSURE OF INVENTION

Technical Problem

The present invention has been made to address the above problems and disadvantages, and to provide at least the advantages described below. Accordingly, the present invention provides a method and apparatus for an eNB to effectively manage UE in a mobile communication system of a heterogeneous network (HetNet) where macro cells and small cells coexist.

The present invention further provides a method and apparatus for an eNB to effectively manage UE and to achieve inter-cell load balancing and inter-cell interference mitigation.

Solution to Problem

In accordance with an aspect of the present invention, an inter-cell load balancing method of a first base station in a wireless communication system of a heterogeneous network (HetNet) including the first base station and a second base station is provided. The method includes: setting up a reserved region for the second base station in order to balance inter-cell load; and controlling the load balancing between base stations, according to the reserved region.

In accordance with another aspect of the present invention, a first base station for balancing load between cells in a wireless communication system of a heterogeneous network (HetNet) including the first base station and a second base station is provided. The first base station includes: a transceiver for transmitting/receiving signals to/from a terminal or the second base station; and a controller for: setting up a reserved region for the second base station in order to balance inter-cell load; and controlling the load balancing between base stations, according to the reserved region.

In accordance with another aspect of the present invention, a measurement reporting method of a terminal in a wireless communication system of a heterogeneous network (HetNet) including first and second base stations is provided. The method includes: receiving a measurement report setup message from the first base station; detecting whether the terminal moves into or out of a reserved region of the second base station; and transmitting a measurement report to the first base station according to the settings of the measurement report setup message.

In accordance with another aspect of the present invention, a terminal for performing the measurement report in a wireless communication system of a heterogeneous network (HetNet) including first and second base stations is provided. The terminal includes: a transceiver for transmitting/receiving signals to/from the base stations; and a controller: receiving a measurement report setup message from the first base station; detecting whether the terminal moves into or out of a reserved region of the second base station; and transmitting a measurement report to the first base station according to the settings of the measurement report setup message.

Advantageous Effects of Invention

According to the present invention, the inter-cell load balancing and the inter-cell interference coordination are capable of increasing the wireless resource efficiency of a network in a mobile communication system of a HetNet where macro eNBs and small eNBs coexist. In addition, the inter-cell load balancing and the inter-cell interference coordination are capable of adaptively employing a load balancing state of a network.

BRIEF DESCRIPTION OF DRAWINGS

FIG. 9 is a diagram that describes a method for a macro eNB to manage a UE status and to set a measurement report for UE status management, according to embodiments of the present invention.

FIG. 10 is a diagram that describes a method for a small eNB to manage a UE status and to set a measurement report for UE status management, according to embodiments of the present invention.

MODE FOR THE INVENTION

Figure 1:
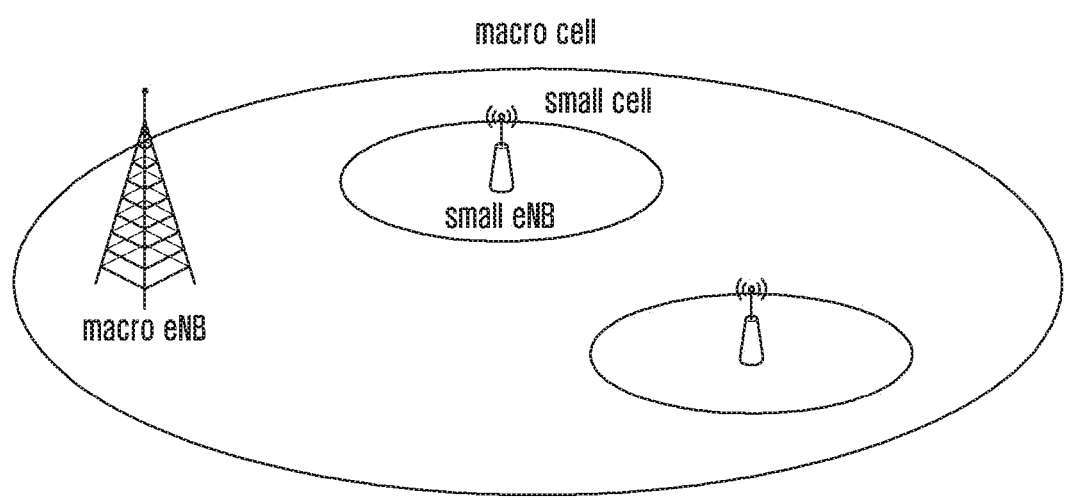
FIG. 1 is a diagram showing the architecture of a mobile communication system in a heterogeneous network (HetNet) where macro cells and small cells coexist.

Hereinafter, embodiments of the present invention are described in detail with reference to the accompanying drawings. The same reference numbers are used throughout the drawings to refer to the same or similar parts. A detailed description of well-known functions and structures when it may make the subject matter of the present invention unclear will be omitted.

Descriptions of functions and structures which are well-known to those skilled in the art and are not directly related to the present invention may be omitted. This is to make the subject matter of the present invention clear and to avoid obscuring it.

Although the drawings represent an embodiment of the invention, the drawings are not necessarily to scale and certain features may be exaggerated or omitted in order to better illustrate and explain the invention. The same reference numbers are used throughout the drawings to refer to the same or similar parts.

The features and advantages of the invention and the method to achieve them will become more apparent from the following detailed description in conjunction with the accompanying drawings. It will be easily appreciated to those skilled in the art that various modifications are possible from the embodiments of the invention that are illustrated and described in detail in the following description, and the scope of the invention should not be limited to the following embodiments. The present invention is defined as in the appended claims. In the description, the same elements are denoted by the same reference numbers.

In addition, it should be understood that the process and the operations of the present invention, described above, can be performed via computer programming instructions. These computer programming instructions can be installed to processors of data processing equipment that can be programmed, special computers, or universal computers. The instructions, performed via the processors of data processing equipment or the computers, can generate means that perform functions described in a block (blocks) of the flow chart. In order to implement functions in a particular mode, the computer programming instructions can also be stored in a computer available memory or computer readable memory that can support computers or data processing equipment that can be programmed. Therefore, the instructions, stored in the computer available memory or computer readable memory, can be installed to the products, and perform the functions therein, described in the blocks of the flow chart therein. In addition, since the computer programming instructions can also be installed to computers or data processing equipment that can be programmed, they can create processes that perform a series of operations therein, described in the blocks of the flow chart therein.

The blocks of the flow chart refer to part of codes, segments or modules that include one or more executable instructions to perform one or more logic functions. It should be noted that the functions described in the blocks of the flow chart may be performed in a different order from the embodiments described above. For example, the functions described in two adjacent blocks may be performed at the same time or in reverse order.

In the embodiments, the terminology, component '~unit,' refers to a software element or a hardware element such as a PGGA, an ASIC, etc., and performs a corresponding function. It should be, however, understood that the component '~unit' is not limited to a software or hardware element. The component '~unit' may be implemented in storage media that can be designated by addresses. The component '~unit' may also be configured to regenerate one or more processors. For example, the component '~unit' may include various types of elements (e.g., software elements, object-oriented software elements, class elements, task elements, etc.), segments (e.g., processes, functions, achievements, attributes, procedures, sub-routines, program codes, etc.), drivers, firmware, micro-codes, circuit, data, data base, data structures, tables, arrays, variables, etc. Functions provided by elements and the components '~units' may be formed by combining the small number of elements and components '~units' or may be divided into additional elements and components '~units.' In addition, elements and components '~units' may also be implemented to regenerate one or more CPUs in devices or security multi-cards.

The following description explains a method and apparatus for load balancing and inter-cell interference coordination in a mobile communication system of a HetNet where macro cells and small cells coexist. In a mobile communication system of a HetNet where macro eNBs and small eNBs coexist, a small eNB (or a small cell) may be additionally installed in an coverage area where a macro eNB (or a macro cell) has been already installed and managed, so that the coverage area of the small eNB can overlap that of the macro eNB. For this case, the following description provides a method and apparatus for balancing load between the macro eNB and the small eNB needs to be balanced and mitigating interference that the macro eNB causes to the small eNB.

FIG. 1 is a diagram showing the architecture of a mobile communication system in a heterogeneous network (HetNet) where macro cells and small cells coexist.

Request for the advance of the data rate of use and network data traffic in a mobile communication system continuously increases. In order to resolve this issue, the traffic capacity per the unit area increases through the construction of additional networks.

The construction of additional networks refers to a method that increases the number of macro eNB (cell) buildings to reduce the region of each cell or additionally constructs small eNBs (small cells) with low power in the region of a macro cell.

The additional construction of small eNBs is advantageous because it is cost-effective compared with the increase in the number of macro eNB buildings; however, the load of an existing macro cell may not be sufficiently balanced by additionally constructed small cells due to the difference in the antenna installation locations and the difference in power between a macro eNB and a small eNB.

Figure 2:
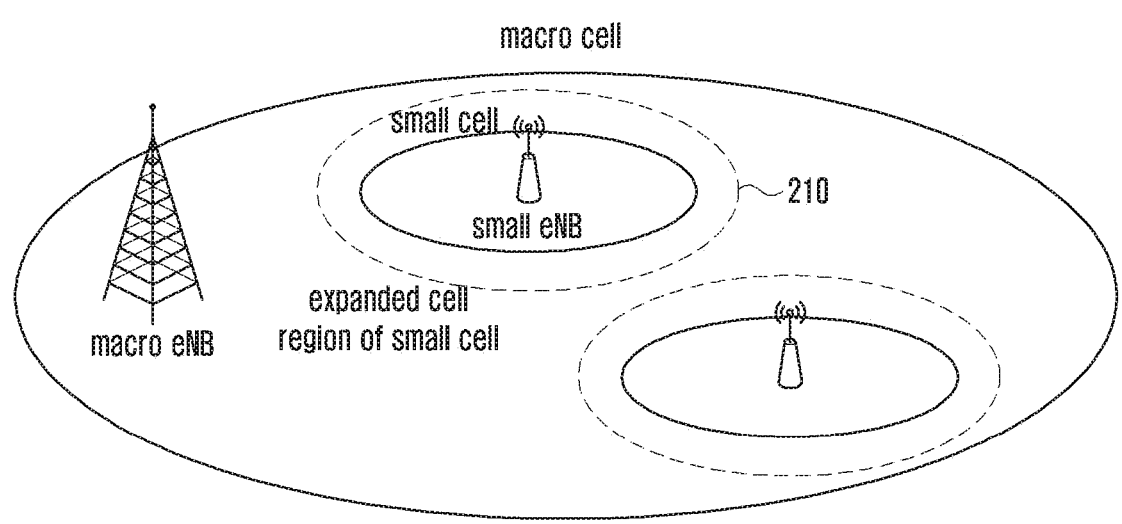
FIG. 2 is an illustration of cell range expansion (CRE) of a small eNB in a mobile communication system with HetNet architecture.

FIG. 2 is an illustration of cell range expansion (CRE) of a small eNB in a mobile communication system with a HetNet architecture.

In order to resolve the load balancing issue, a cell range expansion (CRE) scheme for a small eNB may be considered.

In general, the serving cell selection by UE is performed in such a way that UE measures reception power of neighbor cells and selects a cell which has the highest measured level of reception power. The cell region expansion (CRE) scheme refers to a method that applies a cell-specific offset to the reception power measurement of UE and thus expands a region 210 where a corresponding cell is selected as a serving cell as shown in FIG. 2. Therefore, as CRE is applied to small cells, the load of a macro cell can be balanced with the small cells.

However, since a small cell UE located in a cell expansion region cannot perform normal communication due to the ratio of signal of a serving small cell to strong interference of a macro cell downlink cell, a method is required to control inter-cell interference.

In order to resolve the problem, a specification for Time-Domain Inter-Cell Interference Coordination (TD ICIC) has recently been standardized. TD ICIC restricts a macro eNB causing interference to perform particular signal transmission, channel transmission, and action in part of subframes. This part of the subframes is called an Almost Blank Subframe (ABS).

UEs of a small cell have less interference from a macro cell in a corresponding subframe. The small eNB may use the corresponding subframe for the transmission of UE which is expected to have strong interference from the macro cell. Information regarding the ABS is exchanged via an X2 interface between the eNBs. The X2 interface is a wired interface.

When a macro eNB preforms ABS, the interference experienced by UE of a small cell may vary greatly in difference, depending on whether the macro cell performs ABS and non-ABS. This may cause a problem. In order to resolve this problem, when UE measures a cell and transmits the measurement report, measurement resource restriction is made and a standard for performing reports by restricted resources is established.

As described above, the load of a macro cell is directly and simply balanced with small cells in a HetNet, and this load balancing method enables a network to apply a cell-specific offset to a small cell so that the small cell can collectively handover UE in an expanded cell region to the small cell.

However, the method may have difficulty in discovering a cell-specific offset setting of a small cell which guides the inter-cell load balancing to maximize the network performance. This is because the traffic characteristics and location of UE in a network vary as time elapses. Therefore, it is difficult to estimate the effect of the load balancing between a macro cell and a small cell according to the degree of cell region expansion of a small cell. In addition, according to the specification, a serving eNB may set a cell-specific offset for each UE through the UE-specific signaling (user-specific signaling). Therefore, it is difficult to dynamically alter a macro cell to the cell region expansion of a small cell, according to the load balancing states of a small cell and a macro cell, with the consideration of a signaling overhead.

As described above, the TD ICIC standard defines a least standard containing capability requirements of UE, measurement resource restriction of UE, signaling between eNB and UE, and inter-eNB signaling for a macro cell to perform interference mitigation for a small cell in a HetNet.

Therefore, in order to maximize the speed of UE and the capacity of a network in a HetNet, an apparatus and method of operating a network is required to include the interference coordination and the load balancing between a macro cell and a small cell.

In order to meet the needs, the present invention provides a method and apparatus for performing wireless resource management in a mobile communication system of a HetNet where macro cells and small cells coexist.

In addition, the present invention provides a method and apparatus for performing the load balancing between a macro cell and a small cell in a mobile communication system of a HetNet where macro cells and small cells coexist.

In addition, the present invention provides a method and apparatus for performing the interference coordination between a macro cell and a small cell in a mobile communication system of a HetNet where macro cells and small cells coexist.

Figure 3:
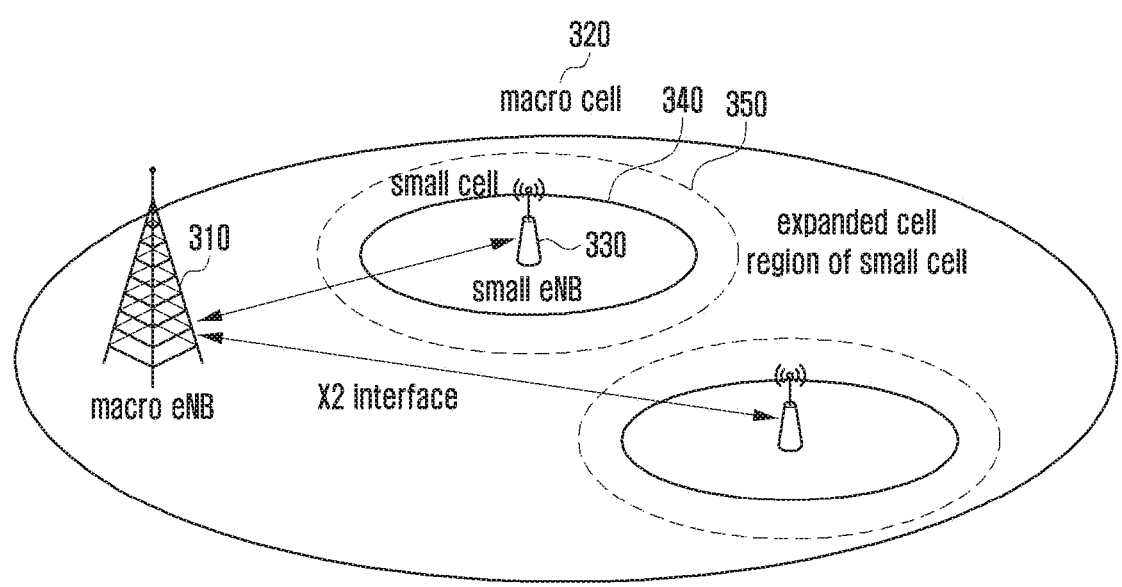
FIG. 3 is a diagram showing the architecture of a network according to embodiments of the present invention.

FIG. 3 is a diagram showing the architecture of a network according to embodiments of the present invention.

As shown in FIG. 3, the HetNet wireless communication system is configured in such a way that one or more small eNBs 330 are located, overlapping each other, in a cell region 320 of a macro eNB 310. The macro eNB 310 includes one or more neighbor macro eNBs or one or more neighbor small eNBs and an X2 interface. The small eNB 330 includes one or more neighbor macro eNB or one or more small eNBs and an X2 interface. The small eNB 220 is capable of including a cell region 340 to which the small eNB 220 can provide services. The cell region 340 can be expanded to an expanded region 350 according to an embodiment of the present invention.

The macro eNB 310 is capable of performing a load balancing function and an Inter-Cell Interference Coordination (ICIC) function, cooperating with one or more small eNBs 330.

Alternatively, the small eNB 330 is capable of performing an inter-cell load balancing function and an ICIC function, cooperating with one or more macro eNBs 310.

In the present disclosure, a correspondent eNB between a macro eNB and a small eNB, which are performing the inter-cell load balancing and the ICIS, is called an 'eICIC partner eNB (or cell)'.

The small eNB 330 is capable of expanding its cell region for the purpose of load balancing from the macro eNB 310.

Figure 4:
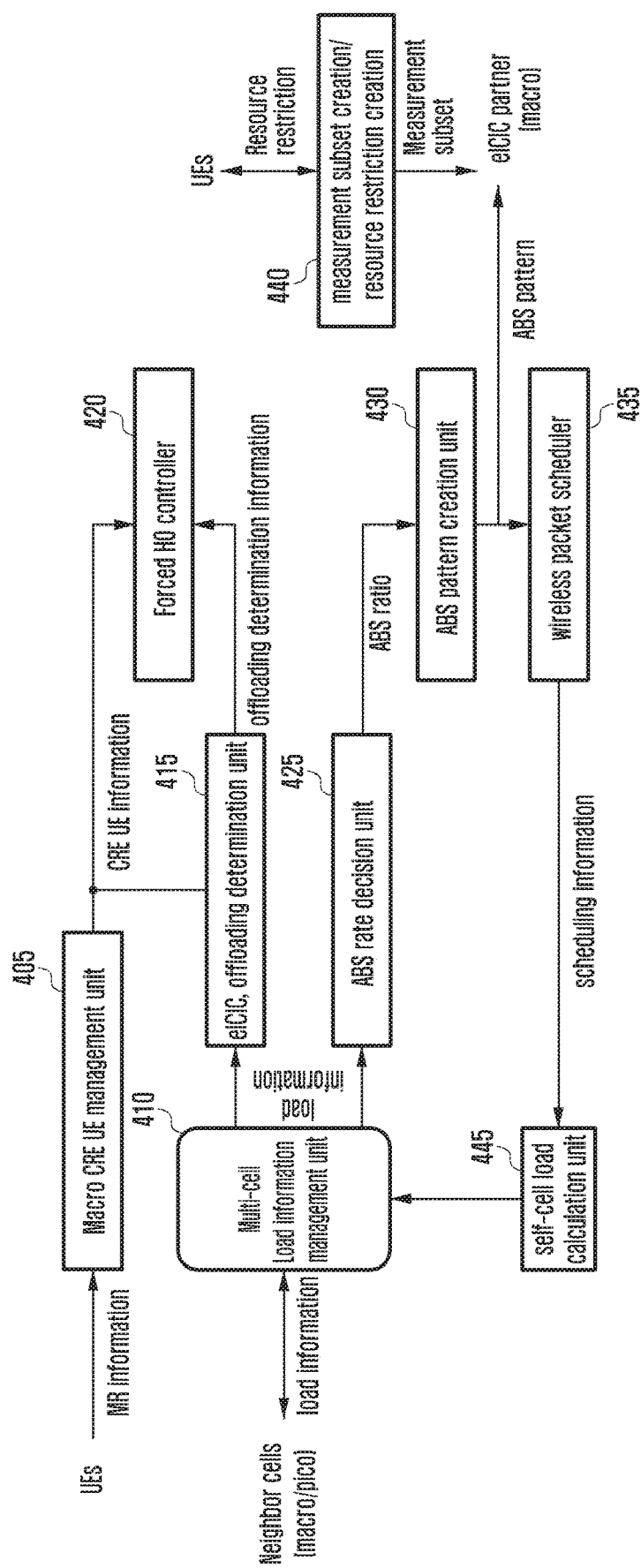
FIG. 4 is a block diagram showing the architecture of a macro eNB according to an embodiment of the present invention.

FIG. 4 is a block diagram showing the architecture of a macro eNB according to an embodiment of the present invention. The macro eNB according to an embodiment includes an inter-cell load balancing controller and inter-cell interference coordinating unit.

The inter-cell load balancing controller of the macro eNB is capable of including a macro CRE UE management unit 405, a multi-cell load information management unit 410, a load balancing handover determination unit 415, and a load balancing handover controller 420.

The inter-cell interference coordinating unit of the macro eNB is capable of including a multi-cell load information management unit 410, an ABS rate decision unit 425, an ABS pattern creation unit 430, a wireless packet scheduler 435, a UE measurement resource controller 440, and an interface with a small eNB.

The macro CRE UE management unit 405 receives MR information from UE in a macro cell as a serving cell, divides the UE into a CRE UE state and a non-CRE UE state, and manages the UE. The macro CRE UE management unit 405 transmits corresponding information to the load balancing handover determination unit 415 and the load balancing handover controller 420.

The multi-cell load information management unit 410 receives neighbor cell load information from a neighbor eNB and self-cell load information from the self-cell load calculation unit 445, and manages a cell load list. The multi-cell load information management unit 410 transmits corresponding information to the load balancing handover determination unit 415 and the ABS rate decision unit 425.

The self-cell load calculation unit 445 receives packet scheduling information from the wireless packet scheduler 435, calculates self-cell load, and transmits the corresponding result to the multi-cell load information management unit 410.

The load balancing handover determination unit 415 receives self-cell information and neighbor cell information from the multi-cell load information management unit 410, determines whether its self-cell load is balanced to the neighbor cell, and transmits offload determination information to the load balancing handover controller 420.

The ABS rate decision unit 425 receives self- and neighbor cell load information from the multi-cell load information management unit 410, determines an ABS rate, and transmits the ABS rate information to the ABS pattern creation unit 430.

The load balancing handover performing unit 420 receives CRE UE information from the macro cell CRE UE management unit 405 and load balancing handover determination information from the load balancing handover determination unit 415, and performs the load balancing handover process.

The ABS pattern creation unit 430 receives an ABS rate from the ABS rate decision unit 425, determines an ABS pattern based on the ABS rate, and transmits the ABS pattern to the wireless packet scheduler 435 and the eICIC partner small eNB.

The wireless packet scheduler 435 receives the ABS pattern from the ABS pattern creation unit 430, schedules wireless resources to UE, considering the received ABS pattern, and transmits the scheduling result to the self-cell load calculation unit 445.

Although the embodiment is described in such a way that a macro eNB includes a number of blocks which perform functions that differ from each other, respectively, it should be understood that the present invention is not limited to the embodiment. For example, a macro eNB may be implemented in such a way that it includes a transceiver for transmitting/receiving signals to/from UE or a small eNB and a controller for performing all the functions described above.

In an embodiment according to the modification, the controller is capable of: setting a reserved region for the small eNB in order to balance load between cells; and controlling the UE according to the reserved region. In this case, the controller is capable of: dividing UE, whose serving eNB is the macro eNB, into a macro cell eNB reserved region UE and a macro cell non-reserved region UE; and managing the UE.

The controller is capable of determining whether the load balancing needs to be performed. When the controller ascertains that the load balancing needs to be performed, it is capable of handing over a UE device to the second eNB. In this case, the controller is capable of determining whether the load balancing needs to be performed, based on at least one of the following: a condition as to whether an inter-cell interference control function is activated, a condition as to whether an inter-cell interference control partner cell exists, an Almost Blank Subframe (ABS) rate currently in use, and a condition whether a macro cell reserved region UE exists.

The controller is capable of selecting one or more UE devices for the load balancing, requesting a measurement report from the selected UE, and receiving a measurement report from the selected UE in response to the request. The controller is capable of selecting UE, located in a reserved region of a second eNB of which load is less than or equal to a predefined threshold, as UE for the load balancing. In addition, the controller is capable of selecting UE, which has the highest Reference Signal Received Power (RSRP) from the small eNB, as UE to perform the handover.

The controller is capable of transmitting, to UE devices, a measurement report setup message for enabling the UE devices to perform, when a UE device enters or moves out of the reserved region, the measurement report. In addition, the controller receives a measurement report from UE that moves into the reserved region, and manages the UE that has moved into the reserved region as macro cell reserved region UE. The controller receives a measurement report from UE that leaves the reserved region, and manages the UE that has left the reserved region as macro cell non-reserved region UE.

Figure 5:
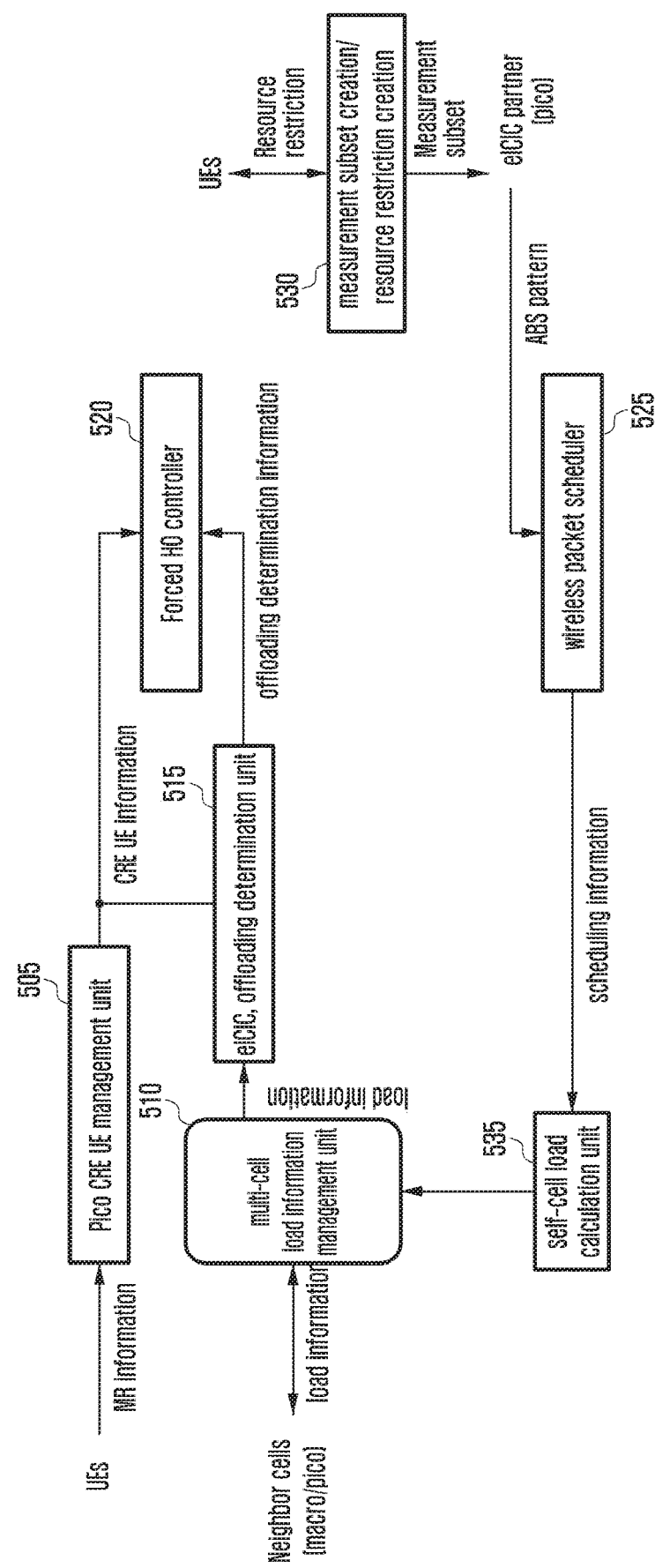
FIG. 5 is a block diagram showing the architecture of a small eNB according to embodiments of the present invention.

FIG. 5 is a block diagram showing the architecture of a small eNB according to embodiments of the present invention. The small eNB according to an embodiment is capable of including an inter-cell load balancing controller and an inter-cell interference coordinating unit.

The inter-cell load balancing controller of the small eNB includes a small cell expansion region UE management unit 505, a multi-cell load information management unit 510, a load balancing handover determination unit 515, and a load balancing handover controller 520.

The inter-cell interference coordinating unit of the small eNB is capable of including a multi-cell load information management unit 510, a wireless packet scheduler 525, UE wireless resource measurement controller 530, and an interface with a small eNB.

The small CRE UE management unit 505: receives MR information received from UE whose serving cell is a small cell; divides the UE into a CRE UE state and a non-CRE UE state; and manages the UE. The small CRE UE management unit 505 transmits corresponding information to the load balancing handover determination unit 515 and the load balancing handover controller 520.

The multi-cell load information management unit 510 receives neighbor cell load information from a neighbor eNB and self-cell load information from the self-cell load calculation unit 535, and manages a cell load list. The multi-cell load information management unit 510 transmits corresponding information to the load balancing handover determination unit 515.

The self-cell load calculation unit 535 receives packet scheduling information from the wireless packet scheduler 525, calculates self-cell load, and transmits the corresponding result to the multi-cell load information management unit 510.

The load balancing handover determination unit 515 receives self-cell information and neighbor cell information from the multi-cell load information management unit 510, determines whether its self-cell load is balanced to the neighbor cell, transmits offload determination information to the load balancing handover controller 520.

The load balancing handover performing unit 520 receives CRE UE information from the small CRE UE management unit 505 and load balancing handover determination information from the load balancing handover determination unit 515, and performs the load balancing handover process.

The wireless packet scheduler 525 receives ABS pattern information from an eICIC partner macro eNB, schedules wireless resources to UE, considering the received ABS pattern, and transmits the scheduling result to the self-cell load calculation unit 535.

Although the embodiment is described in such a way that a small eNB includes a number of blocks which perform functions that differ from each other, respectively, it should be understood that the present invention is not limited to the embodiment. For example, a small eNB may be implemented in such a way that a controller performs all the functions described above, which was already described in the embodiment referring to FIG. 4. Therefore, its detailed description is omitted.

The method for a macro eNB and a small eNB to perform load balancing according to embodiments includes: managing cell region expansion UE, collecting load information regarding the self-cell and the neighbor cells; performing offload; and performing load balancing handover. In the following description, the load balancing method is explained in detail.

Figure 6:
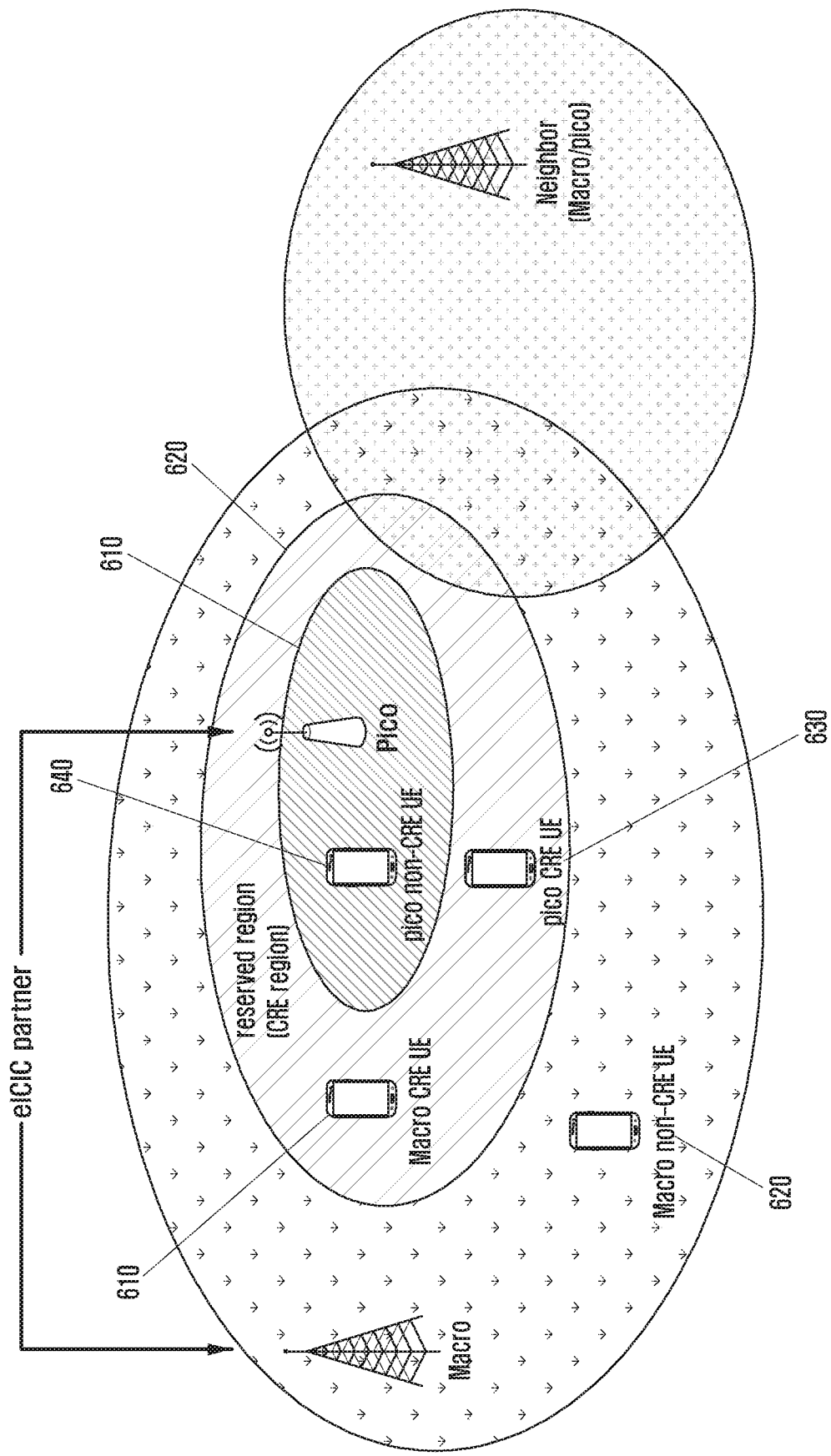
FIG. 6 is a diagram describing a state concept of UE to when CRE is applied according to embodiments of the present invention.

FIG. 6 is a diagram describing a state concept of UE to when CRE is applied according to embodiments of the present invention.

In the following description, in comparison with a 'cell region 610 before CRE' of a small eNB, a 'cell region 620 after CRE' is called a cell expansion region (a CRE region or a reserved region).

In this case, according to an embodiment of the present invention, it should be noted that the 'cell region 620 after CRE' may be used in the sense that it does not contain the 'cell region 610 before CRE.'

When UE is located in a cell expansion region of a small cell and is under a macro cell as a serving cell, the UE is called 'macro cell CRE UE' (or 'macro cell reserved region UE') 610. From among the UE devices whose serving cell is a macro cell, UE except for 'macro cell CRE UE' is called 'macro cell non-CRE UE' (or 'macro cell non-reserved region UE') 620. When UE is located in a cell expansion region of a small cell and is under a small cell as a serving cell, the UE is called 'small cell CRE UE' (or 'small cell reserved region UE') 630. From among the UE devices whose serving cell is a small cell, UE except for 'small cell CRE UE' is called 'small cell non-CRE UE' (or 'small cell non-reserved region UE') 640.

When using the CRE, the present invention operates a cell expansion region as a cell region that a macro cell and a pico cell share, instead of a unique cell region of a small cell or a macro cell.

Figure 7:
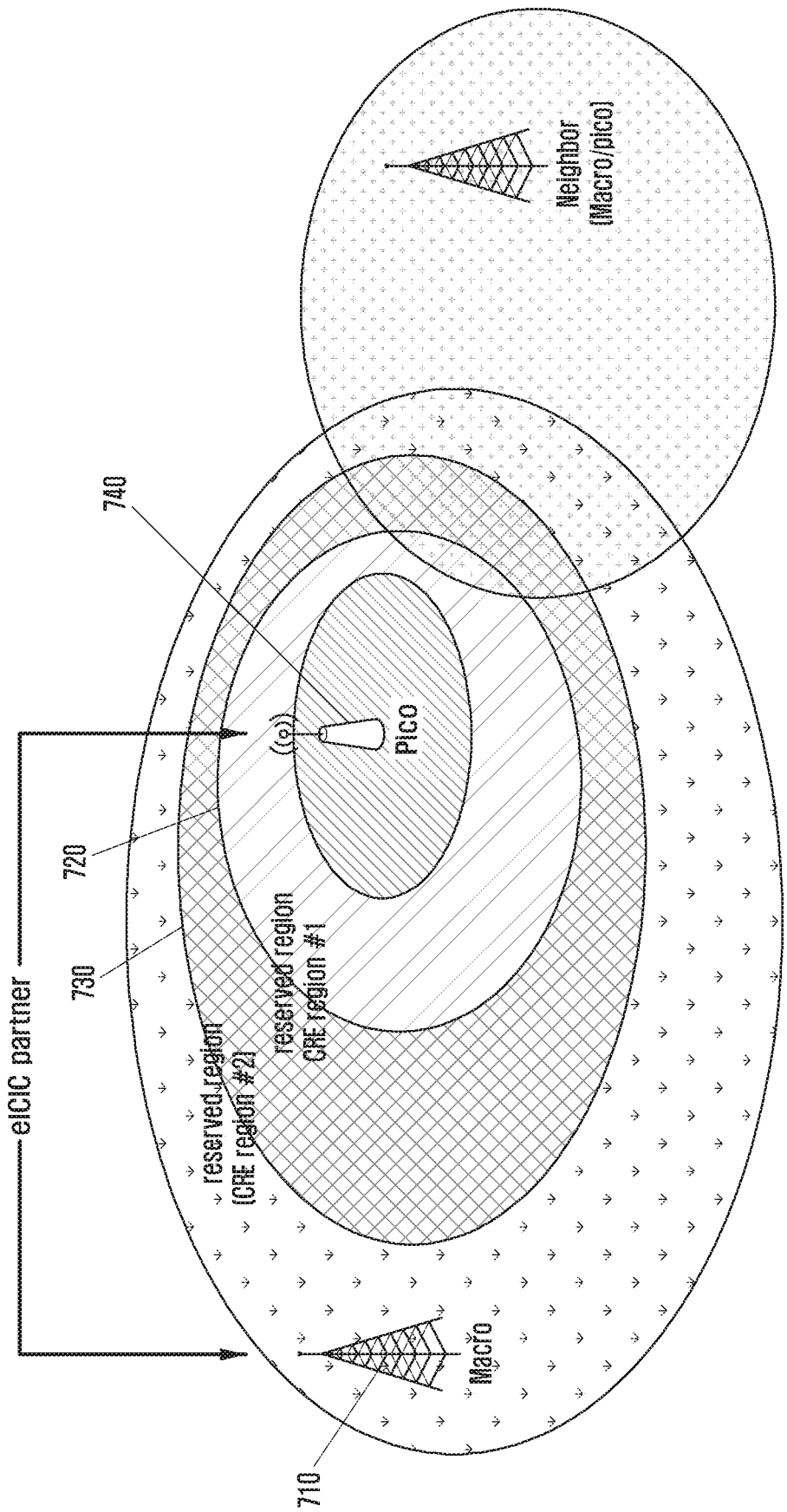
FIG. 7 is a diagram describing an example of a cell-specific, UE-specific small cell expansion region setting, according to an embodiment of the present invention.

FIG. 7 is a diagram describing an example of a cell-specific, UE-specific small cell expansion region setting, according to an embodiment of the present invention.

An extent of region expansion (CRE bias or CRE offset) of a small cell may vary, depending on a condition as to whether UE supports a TD ICIC function, a neighbor cell interference removal function, etc., and the different extents of region expansion are applied to small cell-specific and UE-specific.

To this end, a macro eNB and a small eNB are capable of: receiving information regarding a TD ICIC function and a neighbor cell interference removal capability for UE that the macro eNB and the small eNB provide services to; and applying different extents of small cell expansion thereto. This is described below, referring to FIG. 7.

The macro eNB 710 is capable of setting up a first cell expansion region of a small cell (or first reserved region of a small cell) 720 as a UE-specific small cell expansion region, for UE which supports a TD ICIC function but does not support a neighbor cell interference removal function, from among the UE devices that the macro eNB 710 provides services to.

In addition, the macro eNB 710 is capable of setting up a second cell expansion region of a small cell (or second reserved region of a small cell) 730, which is additionally expanded in comparison with the first expansion region of a small cell, as a UE-specific small cell expansion region, for UE which supports a TD ICIC function and a neighboring cell interference removal function, from among the UE devices that the macro eNB 710 provides services to.

The reason why the second reserved region of a small cell 730 is greater in area than the first reserved region of a small cell 720 is because the second reserved region of a small cell 730 is used for UE which support a neighbor cell interference removal function, and thus corresponding UE can effectively remove interference from the neighbor cell, through a neighbor cell interference removal function. Therefore, the corresponding UE can more effectively remove interference than UE which does not support a neighbor cell interference removal function, and thus receive services a small eNB 740 via a greater region.

Figure 8:
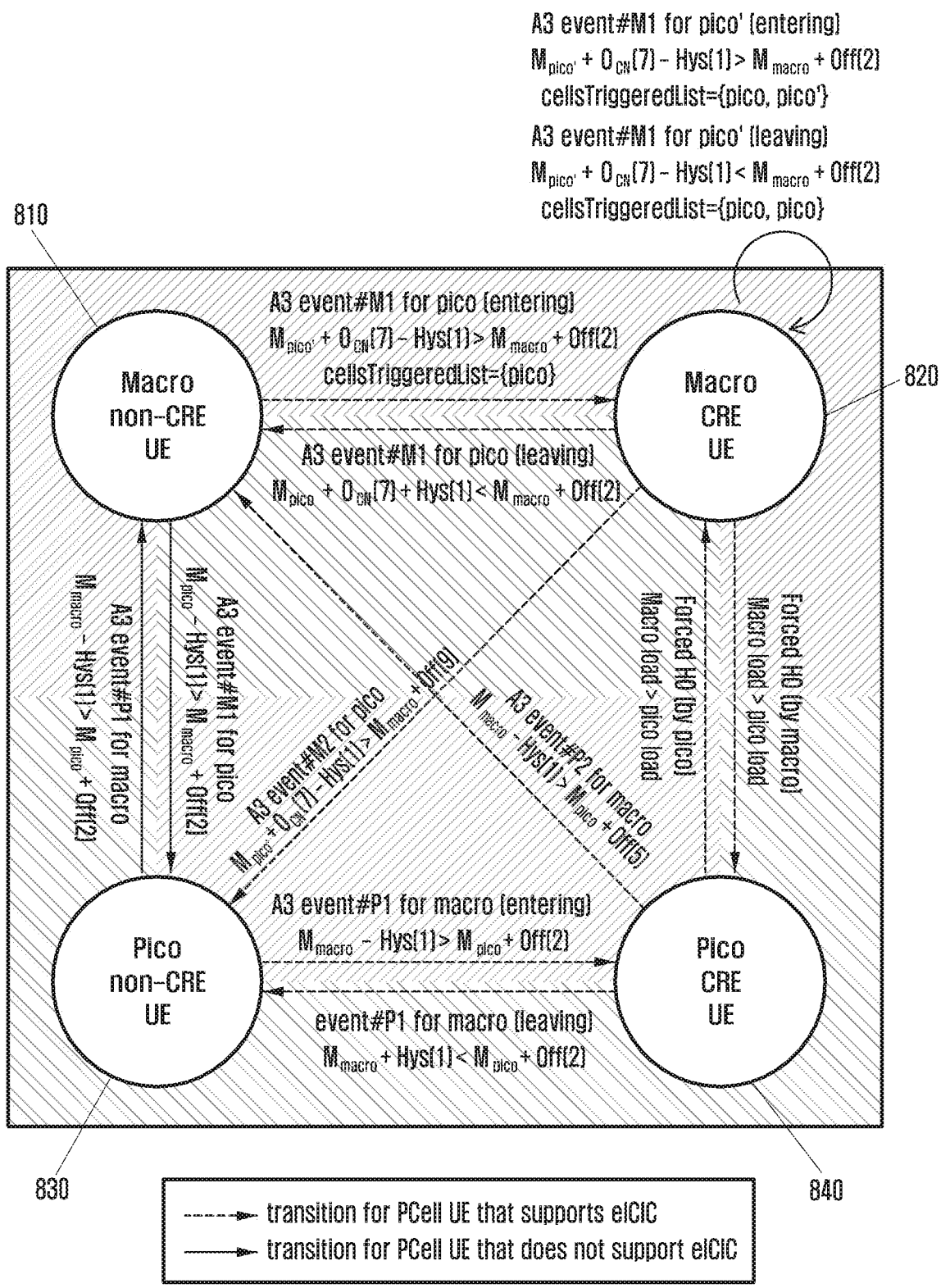
FIG. 8 is a diagram showing an example of a state translation of UE when CRE is applied, according to embodiments of the present invention.

FIG. 8 is a diagram showing an example of a state translation of UE when CRE is applied, according to embodiments of the present invention.

According to embodiments of the present invention, UE may have one of the states, 'macro cell non-CRE UE' 810, 'macro cell CRE UE' 820, 'small cell non-CRE UE' 830, and 'small cell CRE UE' 840.

The macro eNB divides states of UE, whose serving eNB is a corresponding eNB, into 'macro cell CRE UE' and 'macro cell non-CRE UE' according to the UE state transition, and manages the UE.

The small eNB divides states of UE, whose serving eNB is a corresponding eNB, into 'small cell CRE UE' and 'small cell non-CRE UE' according to the UE state transition, and manages the UE.

On the other hand, UE which does not support a TD ICIC function may have a macro cell non-CRE UE state or a macro cell CRE UE state.

On the other hand, UE which supports a TD ICIC function may have one of the following: a macro cell non-CRE UE state, a macro cell CRE UE state, a small cell CRE UE state, and a small cell CRE UE state.

The macro eNB may set a measurement report triggering condition for a macro cell UE which does not support a TD ICIC function, using A3 event, described in the following table 1.

TABLE 1

| A3 event | Off 2 dB, Hys 1 dB |
|---|---|

When the UE satisfies a measurement report triggering condition described below, it may perform the measurement report.

The macro eNB receives the measurement report, and hands over the UE to a small cell. The macro eNB manages the UE that has performed the handover function as a small cell non-CRE UE state.

A3 Event #M1 for Pico $$Mpico-Hys(1)>Mmacro+Off(2)$$

The small eNB may set a measurement report triggering condition for a small cell UE which does not support a TD ICIC function, using A3 event, described in the following table 2.

TABLE 2

| A3 event | Off 2 dB, Hys 1 dB |
|---|---|

When the UE satisfies a measurement report triggering condition described below, it may perform the measurement report. The small eNB receives the measurement report, and hands over the UE to a macro cell. The small eNB manages the UE that has performed the handover function as a macro cell non-CRE UE state.

A3 Event #P1 for Macro $$Mmacro-Hys(1)>Mpico+Off(2)$$

Meanwhile, the macro eNB controls macro cell CRE UE to perform handover for load balancing to a small eNB, considering load states of the macro eNB and the small eNB.

In addition, the small eNB controls small cell CRE UE to perform handover for load balancing to a macro eNB, considering load states of the macro eNB and the small eNB.

The load balancing handover will be described in detail later, referring to FIGS. 13 to 15.

The state transition of UE which supports a TD ICIC is described below referring to FIGS. 9 and 10.

FIG. 9 is a diagram that describes a method for a macro eNB to manage a UE status and to set a measurement report for UE status management, according to embodiments of the present invention.

The macro eNB 910 is capable of setting up a Measurement Report Triggering Condition for dividing UE, whose serving cell is the macro cell, into a macro cell non-CRE UE state and a macro cell CRE UE state, and a Measurement Report Triggering Condition for initiating the handover from the macro cell to the small cell.

When the macro eNB 910 describes a measurement report triggering condition to divide UE into macro cell non-CRE UE and macro cell CRE UE, the macro eNB 910 is capable of setting up a measurement report triggering condition for macro UE, using A3 event, described in the following table 3.

Here, Mmacro may refer to Reference Symbol Received Power (RSRP) from a macro cell; Mpico may refer to RSRP from a small cell; Off may refer to A3-offset parameter, Hys may refer to hysteresis parameter; Ocp may refer to a Cell Individual Offset (CIO) of a primary (or serving) cell; and Ocn may refer to a CIO of a neighbor cell.

In the following table 3, it should be noted that the parameter may be adjusted to have different values according to a network status, interference removal performance of a cell adjacent to UE, etc., assuming a small cell region 6 dB expansion.

TABLE 3

| Ocn (CIO) | 7 dB applied to eICIC support UE and PCell UE only eICIC partner Pico |
|---|---|
| A3 event #M1 | Off 2 dB, Hys 1 dB, reportOnLeave TRUE |
| A3 event #M2 | Off 9 dB, Hys 1 dB |

Referring to table 3 and scenario (1) of FIG. 9, when the non-CRE UE, set up based on table 3, moves from the macro non-CRE region to the macro CRE region, operations of the macro eNB and the UE are described as follows.

When the UE moves from the macro non-CRE region into the macro CRE region, the UE satisfies the following measurement report triggering conditional equation and performs the measurement report. When receiving the measurement report from the UE, the macro eNB 910 makes a transition of the state of the UE from the macro cell non-CRE UE state to the macro cell CRE UE state. The macro eNB 910 is capable of adding the small cell to the cell trigger list of the UE, cellTriggeredList.

A3 Event #M1 for Pico (Entering)

$$Mpico+Ocn(7)-Hys(1)>Mmacro+Off(2)$$

cellsTriggeredList={pico}

Referring to scenario (2) of FIG. 9, when the macro cell CRE UE, set up based on table 3, moves from the macro CRE region to the macro non-CRE region, UE satisfies the following measurement report triggering conditional equation and performs the measurement report.

When receiving the measurement report from the UE, the macro eNB makes a transition of the state of the UE from the macro cell CRE UE state to the macro cell non-CRE UE state. The macro eNB deletes the small cell from the cellTriggerList of the UE.

A3 Event #M1 for Pico (Leaving)

$$Mpico+Ocn(7)+Hys(1)<Mmacro+Off(2)$$

Referring to scenario (4) of FIG. 9, when the macro cell CRE UE, set up based on table 3, moves from the macro cell CRE region to the small cell non-CRE region, UE satisfies the following measurement report triggering conditional equation and performs the measurement report.

When receiving the measurement report from the UE, the macro eNB is capable of controlling the UE to performing the handover to the small eNB.

A3 Event #M2 for Pico $$M\text{pico} + O\text{cn}(7) - H\text{ys}(1) > M\text{macro} + O\text{ff}(9)$$

Referring to scenario (3) of FIG. 9, when the macro CRE UE of the first small cell 920, set up based on table 3, moves from the CRE region of the first small cell to the CRE region of the second small cell 930, UE satisfies the following measurement report triggering conditional equation and performs the measurement report.

When receiving the measurement report from the UE, the macro eNB 910 maintains a macro cell CRE UE state for the UE and adds the second small cell to the cellsTriggeredList.

A3 Event #M1 for Pico #2 (Entering)

$$M\text{pico}' + O\text{cn}(7) - H\text{ys}(1) > M\text{macro} + O\text{ff}(2)$$

cellsTriggeredList={pico #1,pico #2}

Referring to scenario (3) of FIG. 9, when the macro CRE UE of the second small cell 930, set up based on table 3, moves from the CRE region of the second small cell to the CRE region of the first small cell 920, UE satisfies the following measurement report triggering conditional equation and performs the measurement report.

When receiving the measurement report from the UE, the macro eNB 910 maintains a macro cell CRE UE state for the UE and deletes the second small cell from the cellsTriggeredList.

A3 Event #M1 for Pico #2 (Leaving)

$$M\text{pico}' + O\text{cn}(7) + H\text{ys}(1) > M\text{macro} + O\text{ff}(2)$$

cellsTriggeredList={pico #1}

Referring to scenario (3) of FIG. 9, operations of the macro eNB and UE may be applied to a number of small cells.

FIG. 10 is a diagram that describes a method for a small eNB to manage a UE status and to set a measurement report for UE status management, according to embodiments of the present invention.

The small eNB is capable of setting up a Measurement Report Triggering Condition for dividing UE, whose serving cell is the small cell, into small cell non-CRE UE and small cell CRE UE, and a Measurement Report Triggering Condition for initiating the handover from the small cell to the macro cell.

When the small eNB describes a measurement report triggering condition to divide UE into small cell non-CRE UE and small cell CRE UE, the small eNB is capable of setting up a measurement report triggering condition for small cell UE, using A3 event, described in the following table 4.

Here, Mmacro may refer to RSRP from a macro cell; Mpico may refer to RSRP from a small cell; Off may refer to A3-offset; Hys may refer to hysteresis; Ocp may refer to a Cell Individual Offset (CIO) of a primary (or serving) cell; and Ocn may refer to CIO of a neighbor cell.

In the following table 4, it should be noted that the parameter value may vary, according to cells and UE devices, depending on a network status, interference removal performance of a cell adjacent to UE, etc., assuming a small cell region 6 dB expansion.

TABLE 4

| Ocn (CIO) | 0 dB is applied to all |
|---|---|
| A3 event #P1 | Off 2 dB, Hys 1 dB, reportOnLeave TRUE |
| A3 event #P2 | Off 5 dB, Hys 1 dB |

Referring to scenario (5) of FIG. 10, when the non-CRE UE of a small cell 1010, set up based on table 4, moves from the small cell non-CRE region to the small cell CRE region, operations of the small eNB 1010 and the UE are described as follows.

When the UE moves from the small cell non-CRE region into the small cell

CRE region, the UE satisfies the following measurement report triggering conditional equation and performs the measurement report. When receiving the measurement report from the UE, the macro eNB 910 makes a transition of the state of the UE from the small cell CRE UE state to the small cell non-CRE UE state.

A3 Event #P1 for Macro (Entering)

$$M\text{macro} - H\text{ys}(1) > M\text{pico} + O\text{ff}(2)$$

Referring to scenario (6) of FIG. 10, when the small cell CRE UE, set up based on table 4, moves from the small cell CRE region to the small cell non-CRE region, UE satisfies the following measurement report triggering conditional equation and performs the measurement report. When receiving the measurement report from the UE, the small eNB 1010 makes a transition of the state of the UE from the small cell CRE UE state to the small cell non-CRE UE state.

A3 Event #P1 for Macro (Leaving)

$$M\text{macro} + H\text{ys}(1) < M\text{pico} + O\text{ff}(2)$$

Referring to scenario (7) of FIG. 10, when the small cell CRE UE, set up based on table 4, moves from the CRE region to a non-CRE region of a macro cell, UE satisfies the following measurement report triggering conditional equation and performs the measurement report. When receiving the measurement report from the UE, the small eNB 1010 is capable of controlling the UE to performing the handover to the macro eNB 1020.

A3 Event #P2 for Macro $$M\text{macro} - H\text{ys}(1) > M\text{pico} + O\text{ff}(5)$$

Referring to scenario (7') of FIG. 10, when the CRE UE of a first small cell 1010, set up based on table 4, moves from the CRE region of a second small cell 1030 to a CRE region of the second small cell, UE satisfies the following measurement report triggering conditional equation and performs the measurement report. When receiving the measurement report from the UE, the macro eNB 1020 is capable of controlling the UE to performing the handover to the macro eNB 1020.

A3 Event #P2 for Macro $$M\text{macro} - H\text{ys}(1) > M\text{pico} + O\text{ff}(5)$$

Meanwhile, a macro eNB and a small eNB receive scheduling results from a wireless packet scheduler and calculate cell load information respectively. Since the method of calculating cell load information is not directly related to the subject matter of the present invention, its detailed description is omitted.

Meanwhile, a macro eNB and a small eNB collect load information regarding neighbor cells from the neighbor cells and self-cell load information from the cell load calculation units, and manage the information.

Figure 11:
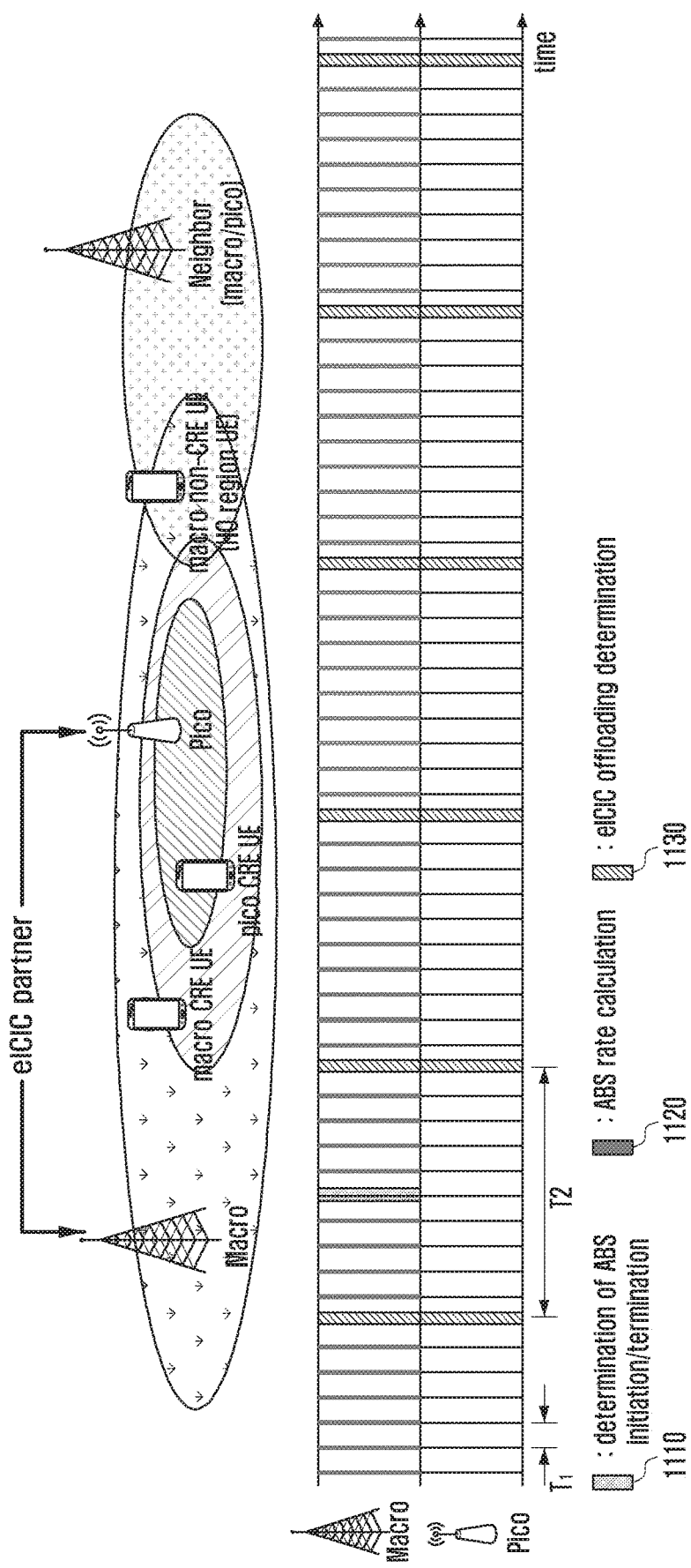
FIG. 11 is a diagram showing the outline of load balancing by a macro eNB and a small eNB, according to embodiments of the present invention.

FIG. 11 is a diagram showing the outline of load balancing by a macro eNB and a small eNB, according to embodiments of the present invention.

When a TD ICIC function is activated (e.g., the activation of an ABS pattern) in a network (1110), the macro eNB determines an ABS rate at every predetermined period (1120) and determines whether it performs the load balancing handover for macro CRE UE to a small eNB at every predetermined period (1130).

Similarly, the small eNB determines whether it performs the load balancing handover for small cell CRE UE to a macro eNB at every predetermined period.

The method of determining whether a load balancing handover process is performed will be described later referring to FIG. 13.

In the following description, the method of determining an ABS rate is explained referring to FIG. 12.

Figure 12:
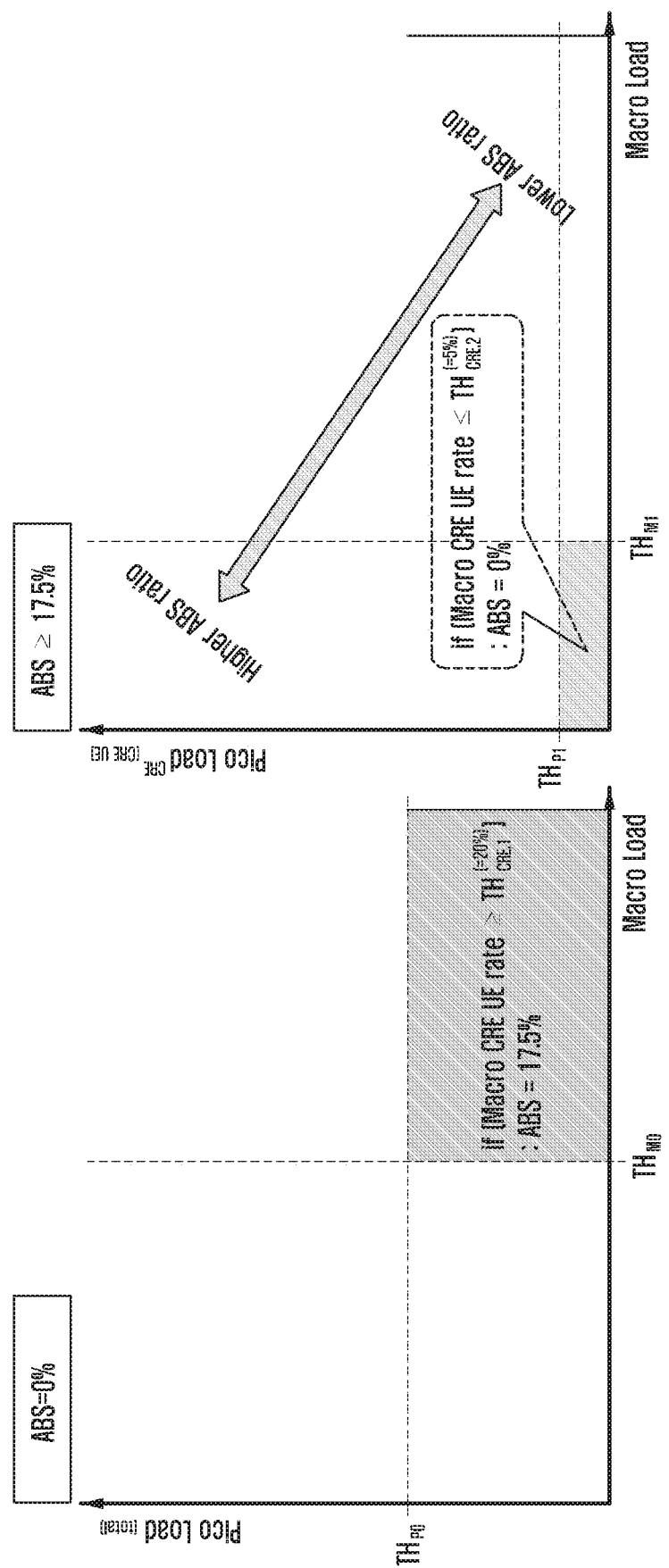
FIG. 12 shows graphs that describe an example of a method of calculating an ABS rate of a macro eNB, according to embodiments of the present invention.

FIG. 12 shows graphs that describe an example of a method of calculating an ABS rate of a macro eNB, according to embodiments of the present invention.

When a macro eNB satisfies a condition as to whether an eICIC function is activated, etc., it determines whether or not it performs ABS. When the macro eNB performs ABS, the macro eNB and the small eNB determines whether an offloading process is performed through the load balancing handover process.

When the ABS rate is zero (0), the macro eNB determines whether or not it performs ABS, based on information containing: the cell load of the macro cell, the cell load of a small cell, and the CRE UE rate of a macro eNB.

For example, when: the load of a macro eNB is greater than or equal to pre-defined THM0; the load of a small eNB is less than or equal to predefined THP0; and the CRE UE rate of a macro eNB is greater than or equal to THCRE, 1, the macro eNB may perform ABS at a predefined ABS rate. The macro eNB may perform the operations at every pre-defined period, T0.

When a current ABS rate is greater than or equal to at least pre-defined ABS rate, the macro eNB may determine an ABS rate, based on information containing the number of UE devices by UE states and loads by cells.

When: the load of a macro eNB is less than or equal to pre-defined THM1; and the load of a small eNB is less than or equal to predefined THP1, the macro eNB may not perform ABS. The macro eNB may perform the operations at every pre-defined period, T1.

When an ABS rate is determined through the process, the macro eNB selects a predefined ABS pattern corresponding to the ABS rate.

Figure 13:
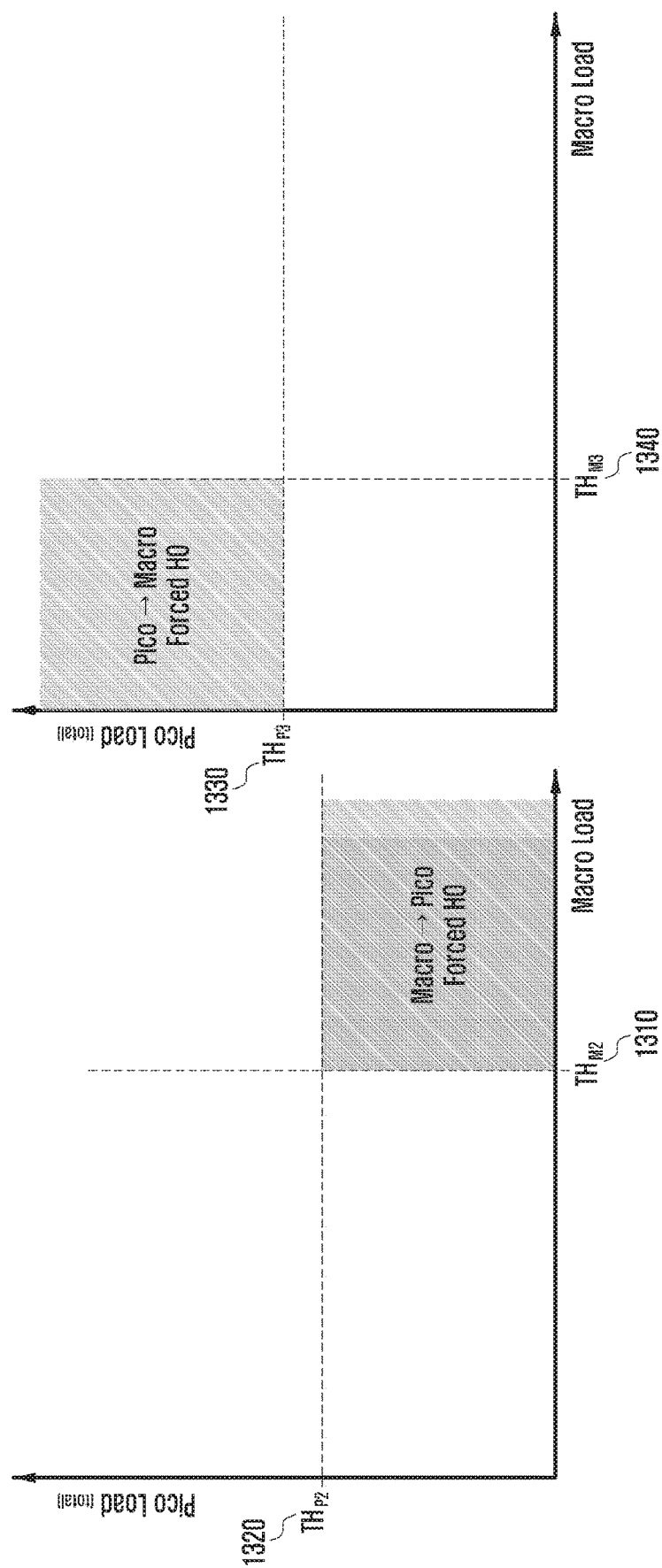
FIG. 13 shows graphs that describe a method of determining handover for load balancing of a macro eNB and a small eNB, according to an embodiment of the present invention.

FIG. 13 shows graphs that describe a method of determining handover for load balancing of a macro eNB and a small eNB, according to an embodiment of the present invention.

When a macro eNB satisfies a condition as to whether an eICIC function is activated, a condition as to whether an eICIC partner cell exists, a currently applied ABS rate, a condition as to whether a macro cell CRE UE exists, etc., it determines whether macro cell CRE UE needs to perform the load balancing handover to an eICIC partner small cell.

The macro eNB determines whether the load balancing handover is performed based on information containing a load extent of the macro eNB and a load extent of a small eNB. For example, when: the load of a macro eNB is greater than or equal to THM2 (1310); and the load of a small eNB is less than or equal to THP2 (1320), the macro eNB may perform the load balancing handover for the macro cell CRE UE to the small eNB. The macro eNB may perform the operation at every predefined period of time, T2.

Similarly, when a small eNB satisfies a condition as to whether an eICIC function is activated, a condition as to whether an eICIC partner cell exists, a currently applied ABS rate, a condition as to whether a small cell CRE UE exists, etc., it determines whether small cell CRE UE needs the load balancing handover to an eICIC partner small cell. The small eNB determines whether the load balancing handover is performed based on information containing a load extent of the small eNB and a load extent of a macro eNB.

For example, when the load of a small eNB is greater than or equal to THP3 (1330); and the load of a small eNB is less than or equal to THM3 (1340), the small eNB may perform the load balancing handover for the small cell CRE UE to the macro eNB. The small eNB may periodically perform the operation.

Figure 14:
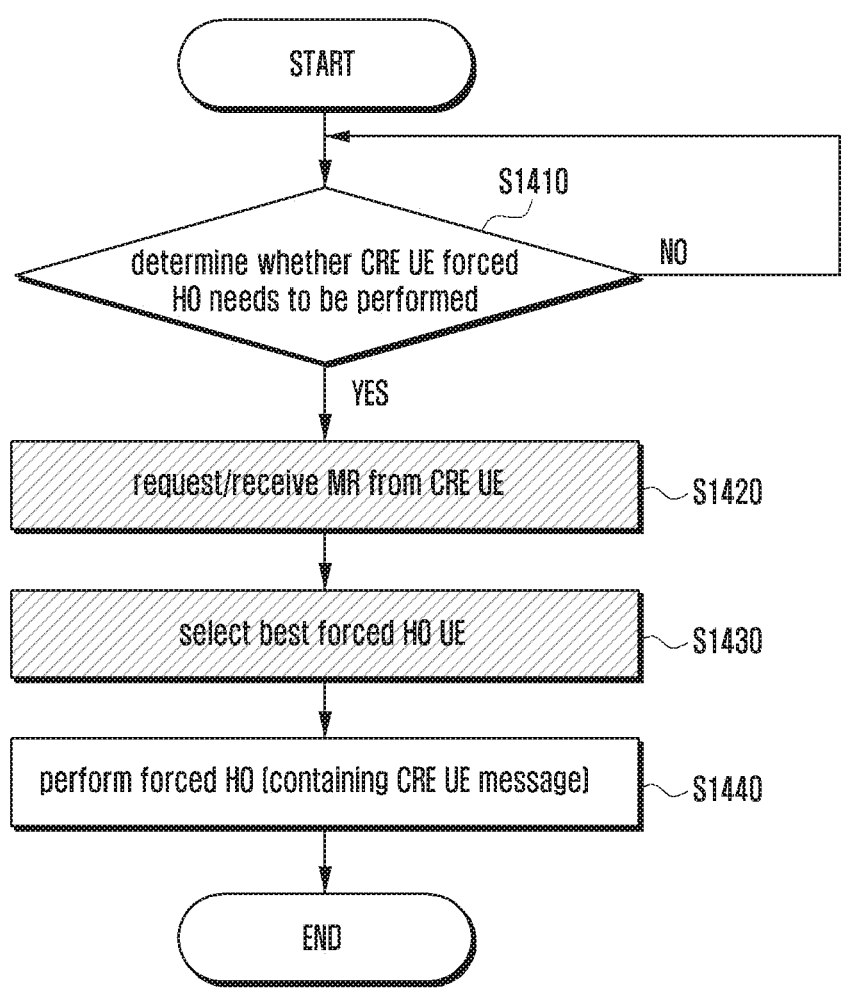
FIG. 14 is a flowchart that describes a method for performing the load balancing handover (forced handover) of a macro eNB and a small eNB, according to an embodiment of the present invention.

FIG. 14 is a flowchart that describes a method for performing the load balancing handover (forced handover) of a macro eNB and a small eNB, according to an embodiment of the present invention.

The macro eNB is capable of determining the load balancing handover to a small eNB of macro cell CRE UE in operation S1410.

The macro eNB requests a measurement report from one or more UE devices from among the macro cell CRE UE in operation S1420.

When receiving measurement reports from corresponding UE, the macro eNB selects one or more UE devices which need the load balancing handover, from among the UE devices that have reported measurements in operation S1430.

The macro eNB hands over corresponding UE to a small cell in operation S1440.

For example, macro CRE UE from which a macro eNB needs to request a measurement report may be selected from UE of which the load of a CRE small cell is less than or equal to predefined THP2.

Alternatively, one of the methods for a macro eNB to select load balancing handover UE from the UE devices that have reported measurements is performed by selecting UE in order of RSRP highest to lowest from a small eNB.

When one UE device is macro cell CRE UE for a number of small cells, the macro eNB may select load balancing handover UE from the UE devices that have reported measurements, by selecting a small eNB with the highest RSRP for the individual UE devices and then selecting UE in order of RSRP highest to lowest.

Similarly, the small eNB is capable of determining to perform the load balancing handover of small cell CRE UE to a macro eNB.

The small eNB requests a measurement report from one or more UE devices from among the small cell CRE UE.

When receiving measurement reports from corresponding UE, the small eNB selects one or more UE devices which need the load balancing handover, from among the UE devices that have reported measurements.

The small eNB hands over corresponding UE to a macro cell. The macro eNB selects load balancing handover UE, only when a macro eNB with the highest measurement report value is an eICIC partner of a small eNB.

Figure 15:
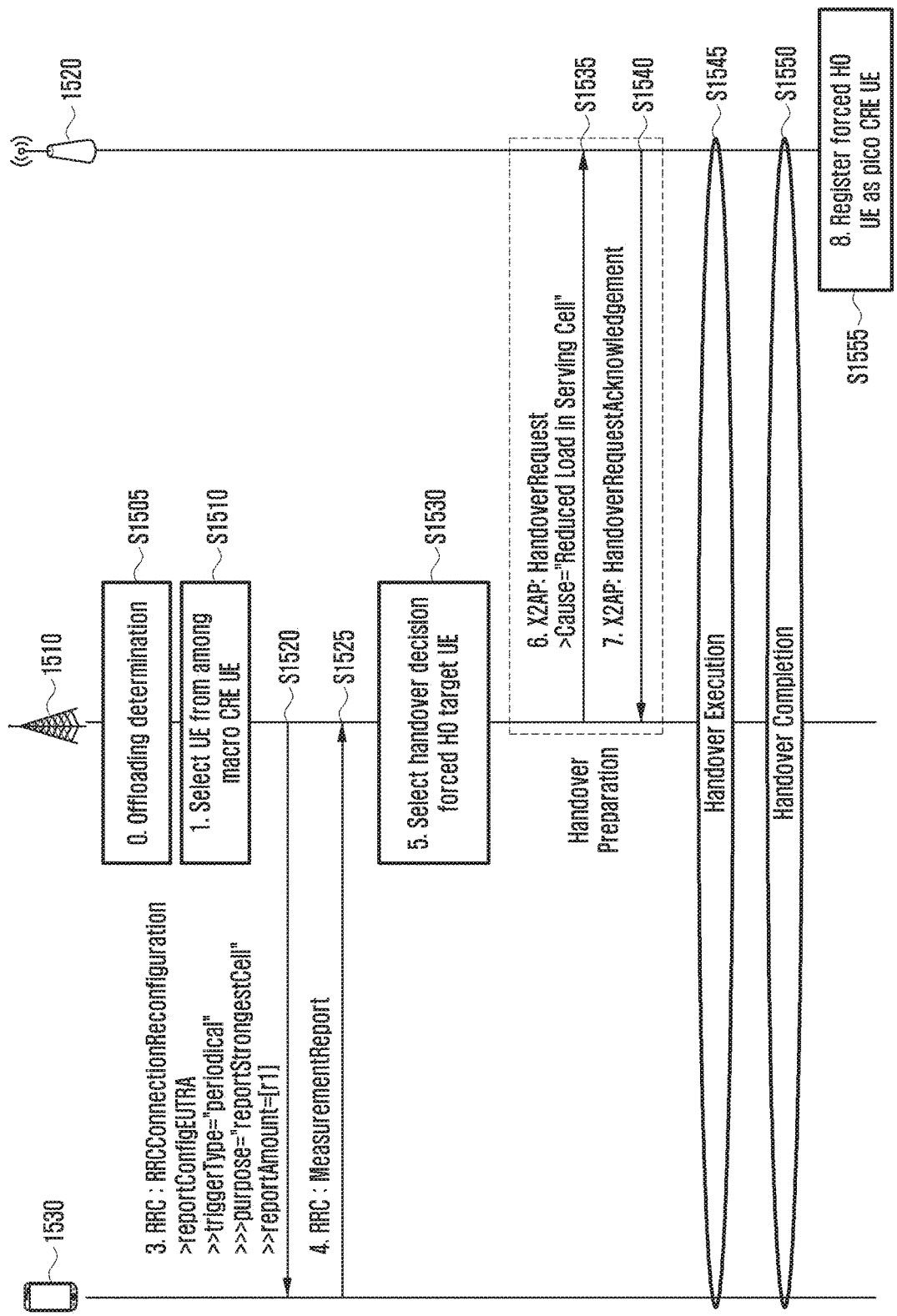
FIG. 15 is a flow diagram that describes the flow of messages and the operations between a macro eNB 1510, a small eNB 1520, and UE 1530 when the macro eNB performs the load balancing handover to the small eNB, according to an embodiment of the present invention.

FIG. 15 is a flow diagram that describes the flow of messages and the operations between a macro eNB 1510, a small eNB 1520, and UE 1530 when the macro eNB performs the load balancing handover to the small eNB, according to an embodiment of the present invention.

The macro eNB 1510 is capable of determining whether it performs the handover for load balancing of macro cell UE to a small cell 1520 in operation S1505.

When the macro eNB 1510 determines to perform the handover for load balancing, it selects one or more UE 1530 from the macro cell CRE UEs devices in operation S1510.

The macro eNB 1510 transmits, to the UE 1530, an RRC message for RRC connection reconfiguration, RRCConnectionReconfiguration, and requests to the UE to perform the measurement report in operation S1520. The message may contain {triggerType="periodical", purpose="reportStrongestCell", reportAmount=[r1]} information.

When receiving the message, the UE 1530 transmits, to the macro eNB 1510, an RRC message for a Measurement Report containing measurement information regarding a neighbor cell in operation S1525.

The macro eNB 1510 selects target UE of the load balancing handover, based on information regarding neighbor cell measurement values contained in a measurement report RRC messages received from individual UE 1530 in operation S1530.

The macro eNB 1510 transmits a handover request (HandoverRequest) X2 message to a handover target small eNB 1520, so that the UE 1530 requests the handover from the small eNB 1520 in operation S1535. The message may contain {Cause="Reduced Load in Serving Cell"} information.

When the small eNB 1520 receives the message and determines that it can provide services to the UE 1530, it transmits, to the macro eNB 1510, a handover request acknowledgement (HandoverRequestAcknowledgement) X2 message in operation S1540.

After that, the macro eNB 1510, small eNB 1520, and UE 1530 perform the handover execution (Handover Execution) procedure and the handover completion (Handover Completion) procedure in operations S1545 and S1550.

When the small eNB 1520 ascertains that its received handover request (HandoverRequest) X2 message contains {Cause="Reduced Load in Serving Cell"}, it may register handover target UE as the small cell CRE UE state.

It should be noted that the operation procedure and the message exchange procedure, described above, can be applied to the load balancing handover from a small eNB to a macro eNB.

In the following description, methods of performing the inter-cell interference coordination (ICIC) by a macro eNB and a small eNB is explained.

The method for a macro eNB to perform the ICIC includes: calculating self-cell load information; collecting self- and neighbor-cell load information; determining an ABS rate; determining an ABS pattern; and scheduling wireless packets according to the ABS pattern.

The macro eNB receives a scheduling result from a wireless packet scheduler, and calculates load information regarding its cell. The cell load information may be calculated based on information containing the wireless resource usage ratio.

The macro eNB collects load information regarding neighbor cells from the neighbor cells and its cell load information received from its cell load calculation unit, and manages the information.

As described above referring to FIG. 12, the macro eNB may determine an ABS rate, from macro cell load information, small cell load information, and information containing a macro cell CRE UE rate.

The macro eNB determines an ABS pattern corresponding to the ABS rate determined via the process.

The macro eNB transmits, to an eICIC partner small eNB, an X2 message containing information regarding a measurement subset and information regarding the determined ABS pattern.

The macro eNB schedules wireless packets considering the determined ABS pattern. 'Signals and Channels transmitted in ABS' and 'Signals and Channels not transmitted in ABS' by the wireless packet scheduler follow predefined rules.

The method for a small eNB to perform the ICIC includes: calculating self-cell load information; collecting self- and neighbor-cell load information; collecting ABS pattern information via an X2 message received from an ICIC partner eNB; and scheduling wireless packets considering the ABS pattern.

The small eNB receives a scheduling result from a wireless packet scheduler, and calculates load information regarding its cell. The cell load information may be calculated based on information containing the wireless resource usage ratio.

The small eNB collects load information regarding neighbor cells from the neighbor cells and its cell load information received from its cell load calculation unit, and manages the information.

The small eNB schedules wireless packets considering the ABS pattern of the eICIC partner macro eNB. In the wireless packet scheduling, the small eNB preferentially allocates wireless resources of protected subframes corresponding to ABS to UE with a large amount of interference with a macro eNB, thereby mitigating the macro cell interference to corresponding UE.

The small eNB instructs UE, whose serving eNB is a small eNB, to perform the measurement resource restriction, considering measurement subset information received from an eICIC partner.

The small eNB receives the scheduling result from the wireless packet scheduler, and calculate load information regarding its cell. The small eNB transmits, to the eICIC partner macro eNB, the self-cell load information via an X2 message.

Figure 16:
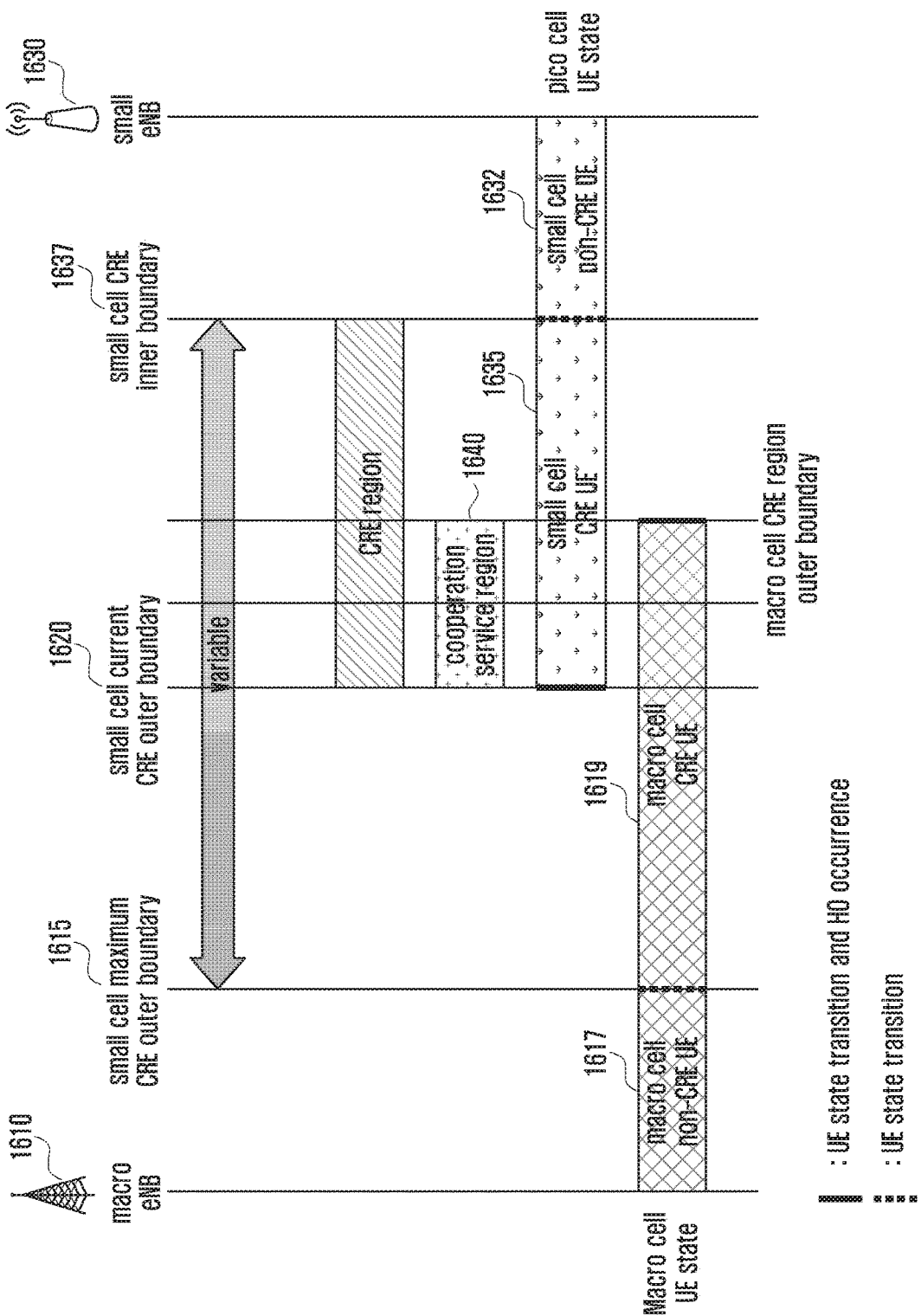
FIG. 16 is a flow diagram that describes the concept of an integrated load balancing method by combining CRE region coordination with load balancing handover, according to an embodiment of the present invention.

FIG. 16 is a flow diagram that describes the concept of an integrated load balancing method by combining CRE region coordination with load balancing handover, according to an embodiment of the present invention.

Referring to FIG. 16, the inter-cell load balancing is described based on operations combined by a 'method using balancing load handover' with a 'method of adjusting a small cell expansion region,' described in FIGS. 8 to 15.

The macro eNB 1610 divides UE, whose serving eNB is a macro eNB, into a macro cell CRE UE state and a macro cell non-CRE state, and manages the UE.

The macro eNB 1610 defines: a portion, except for a region from the center of a small cell to the maximum CRE outer boundary 1615 of the small cell, as a 'macro cell non-CRE region' of the entire region of a macro cell; and the state of UE located in a corresponding region as 'macro cell non-CRE UE state' (1617).

In addition, the macro eNB 1610 defines: a region from the 'maximum CRE outer boundary 1615 of a small cell' to a 'current CRE outer boundary 1620 of the small cell,' as a 'macro cell CRE region'; and the state of UE located in a corresponding region as 'macro cell CRE UE state' 1619.

The small eNB 1630 divides UE, whose serving eNB is a small eNB, into a small cell CRE UE state and a small cell non-CRE state, and manages the UE. The small eNB 1630 defines: a cell region before expanding a small cell as a 'small cell non-CRE region' and the state of UE located in a corresponding region as a 'small cell non-CRE UE state' (1632).

In addition, the small eNB 1630 defines: a region from a 'cell region boundary before expanding a small cell' to a 'current CRE outer boundary' (1620) as a 'small cell CRE region'; and the state of UE located in a corresponding region as a 'small cell CRE region UE state' (1635).

The macro eNB 1610 and the small eNB 1630 commonly define a region from a current, small cell CRE outer boundary to a macro cell CRE region outer boundary as a cooperation service region 1640.

The macro eNB 1610 sets up two measurement report A3-events for measurement report to UE whose serving eNB is a macro eNB.

A first event is set up based on a small cell maximum CRE outer boundary 1615, i.e., a boundary satisfying Mmacro+Off=MPico+CRE_offset_max. The corresponding boundary is used so that the macro eNB 1610 divides UE into macro cell non-CRE UE and macro cell CRE UE.

A second event is set up based on a macro cell, current CRE outer boundary 1640, i.e., Mmacro+Off=MPico+CRE_offset_current. The corresponding boundary serves as a standard so that UE performs handover from a macro cell to a small cell.

The small eNB 1630 sets up two measurement report A3-events for measurement report to UE whose serving eNB is a small eNB.

A first event is set up based on a small cell CRE inner boundary 1637, i.e., a boundary satisfying Mmacro=MPico+Off. The corresponding boundary is used so that the small eNB 1630 divides UE into small cell non-CRE UE and small cell CRE UE.

A second event is set up based on a small cell, current CRE outer boundary 1620, i.e., a boundary satisfying Mmacro=MPico+Off+CRE_offset_current.

Here, Mmacro refers to RSRP from a macro cell; Mpico refers to RSRP from a pico cell; CRE_offset_max refers to an extent of maximum cell region expansion applicable to a small cell; CRE_offset_current refers to an extent of cell region expansion applied to a current small cell; and Off refers to an A3-offset.

The small eNB 1630 divides UE, whose serving eNB is a small eNB, into a small cell CRE UE state and a small cell non-CRE state, and manages the UE.

The method described above differs from the method referring to FIG. 6 in that the macro eNB 1610 restricts a region where small cell CRE UE is located to part of a CRE region.

Here, the network defines a region, where macro cell CRE UE and small cell CRE UE are commonly located, as a cooperation service region 1640. When the macro eNB 1610 needs to perform the load balancing handover, it identifies cooperation service region UE from the macro cell CRE UE. The macro eNB selects load balancing handover target UE from among the cooperation service region UE. The macro eNB performs the load balancing handover.

Figure 17:
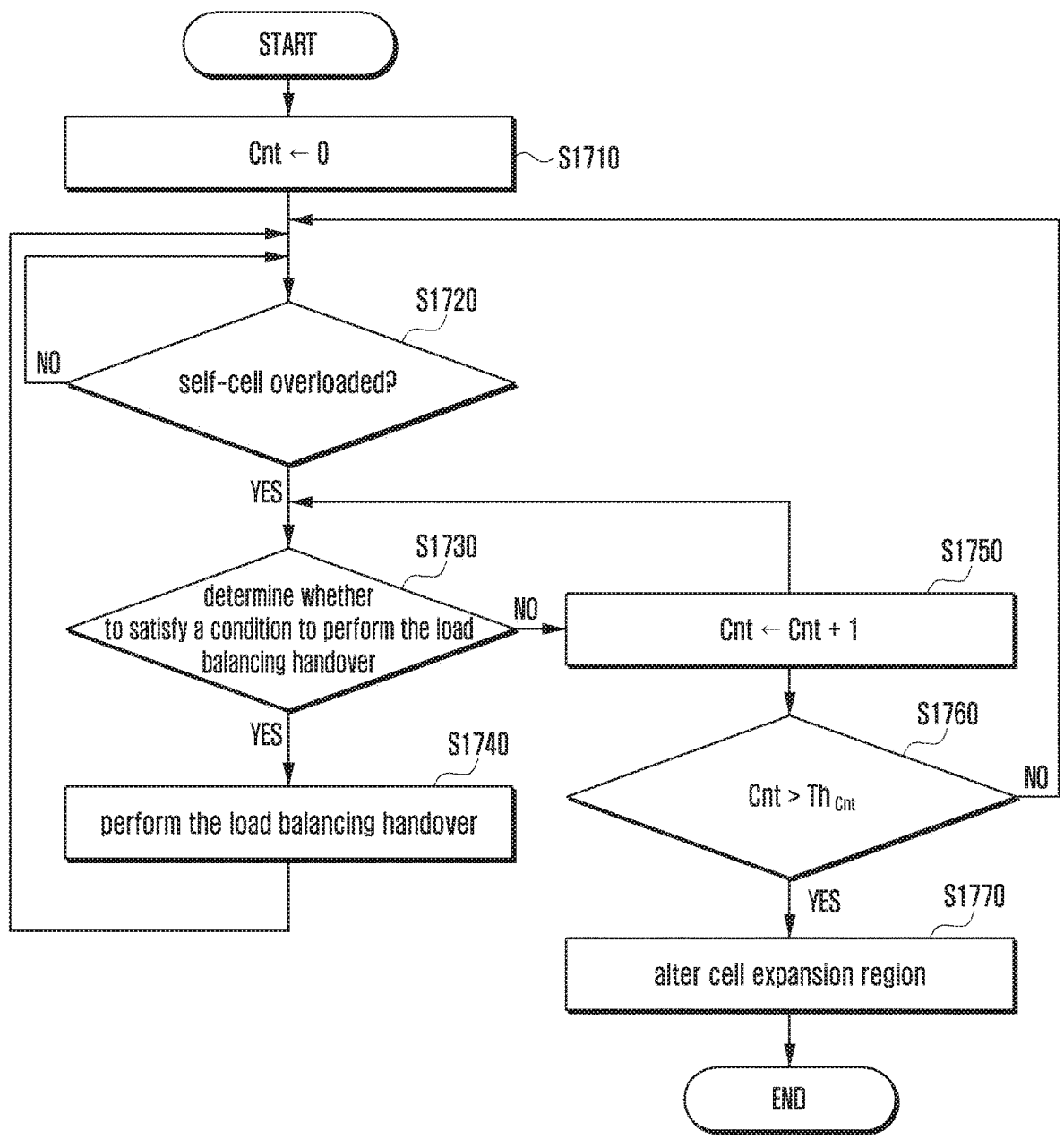
FIG. 17 is a flowchart that describes an integrated inter-cell load balancing method by combining CRE region coordination with load balancing handover between a macro eNB and a small eNB, according to embodiments of the present invention.

FIG. 17 is a flowchart that describes an integrated inter-cell load balancing method by combining CRE region coordination with load balancing handover between a macro eNB and a small eNB, according to embodiments of the present invention.

The eNB initialize the counter Cnt to zero (0) in operation S1710. The eNB determines whether it is overloaded from information containing self-cell load information in operation S1720.

When the eNB is in an overload state, it proceeds with operation S1730. On the other hand, when the eNB is in a normal state, it repeats operation S1720.

In operation S1730, the eNB determines whether it satisfies a condition to perform the load balancing handover as described above referring to FIG. 13. When the eNB ascertains that it satisfies a condition, it proceeds with operation S1740.

In operation S1740, the eNB performs the load balancing handover process and returns to operation S1720.

On the other hand, when the eNB ascertains that it does not satisfy a condition to perform the load balancing handover, it increases the counter Cnt by 1 in operation S1750. After that, the eNB determines whether Cnt value exceeds a predefined parameter, THcnt in operation S1760.

When the eNB ascertains that Cnt value exceeds a predefined parameter, THcnt in operation S1760, it performs a process for requesting the alteration of a small cell expansion region in operation S1770. On the other hand, when the eNB ascertains that Cnt value does not exceed a predefined parameter, THcnt in operation S1760, it returns to operation S1720.

In the process of requesting the alteration of a small cell expansion region in operation S1770, the macro eNB requests the expansion of a small cell region and the small eNB requests the reduction of a small cell region.

Figure 18:
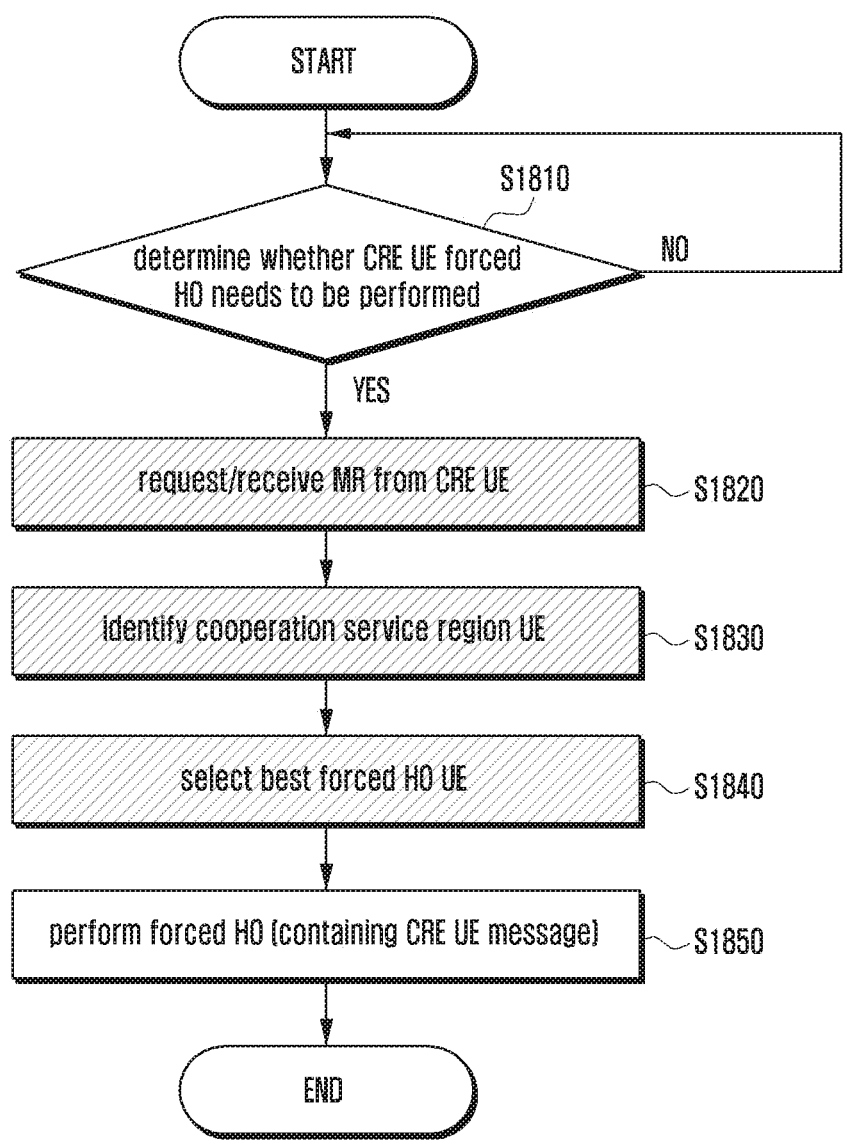
FIG. 18 is a flowchart that describes a load balancing handover procedure of an eNB in an integrated inter-cell load balancing method by combining CRE region coordination with load balancing handover, according to embodiments of the present invention.

FIG. 18 is a flowchart that describes a load balancing handover procedure of an eNB in an integrated inter-cell load balancing method by combining CRE region coordination with load balancing handover, according to embodiments of the present invention.

The macro eNB is capable of determining to hand over macro cell CRE UE to a small eNB for load balancing in operation S1810.

The macro eNB requests measurement reports from one or more UE devices from among the macro cell CRE UE in operation S1820. The macro eNB identifies cooperation service region UE from the received measurement report.

The cooperation service region UE refers to macro UE satisfying Mmacro+Off>Mpico+CRE_offset_current and Mmacro<Mpico+Off+CRE_offset_current.

The macro eNB selects on or more UE device which need to perform the load balancing handover from among the cooperation service region UE devices that have reported measurements in operation S1840.

The macro eNB hands over corresponding UE to a small cell in operation S1850.

In this case, macro CRE UE from which a macro eNB needs to request a measurement report may be selected from UE of which the load of a CRE small cell is less than or equal to predefined THP2.

Alternatively, one of the methods for a macro eNB to select load balancing handover UE from the UE devices that have reported measurements is performed by selecting UE in order of RSRP highest to lowest from a small eNB.

When one UE device is macro cell CRE UE for a number of small cells, the macro eNB may select load balancing handover UE from the UE devices that have reported measurements, by selecting a small eNB with the highest RSRP for the individual UE devices and then selecting UE in order of RSRP highest to lowest.

Similarly, the small eNB is capable of determining to hand over small cell CRE UE to a macro eNB for load balancing in operation S1810.

The small eNB requests a measurement report from one or more UE devices from among the small cell CRE UE in operation S1820. The small eNB identifies cooperation service region UE from the received measurement report in operation S1830.

Here, cooperation service region UE is small cell UE satisfying Mmacro+Off>Mpico+CRE_offset_current and Mmacro<Mpico+Off+CRE_offset_current.

The small eNB selects one or more UE devices that need to perform the load balancing handover from among the cooperation service region UE devices that have reported measurements in operation S1840.

The small eNB controls corresponding UE to perform the handover to a macro cell in operation S1850.

Meanwhile, when a macro eNB may select load balancing handover UE, it is performed only when the macro eNB which has the largest measurement report value is an eICIC partner of a small eNB.

Figure 19:
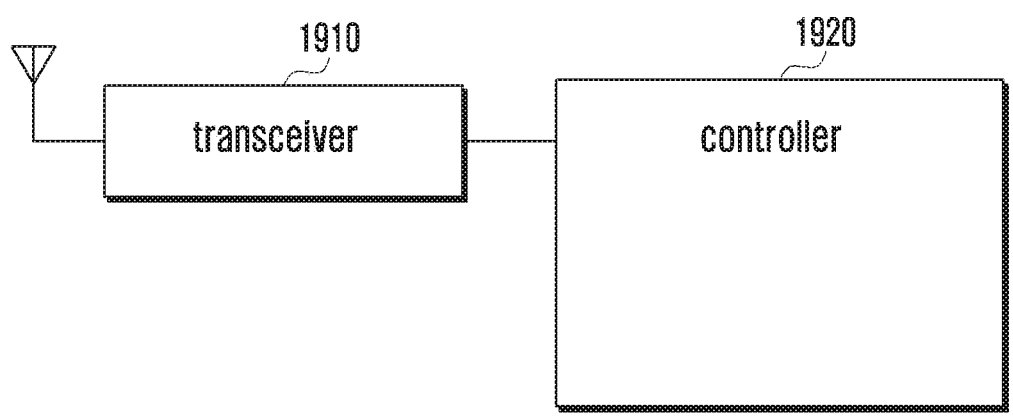
FIG. 19 is a block diagram showing the architecture of UE, according to embodiments of the present invention.

FIG. 19 is a block diagram showing the architecture of UE, according to embodiments of the present invention. As shown in FIG. 19, UE is capable of including a transceiver 1910 and a controller 1920.

The transceiver 1910 is capable of establishing a wireless channel with an eNB and transmitting/receiving signals to/from it.

The controller 1920 controls signals flowing between blocks to perform functions according to embodiment of the present invention.

The controller 1920 is capable of controlling the reception of measurement report setup messages from a macro eNB or small eNB. The controller 1920 is capable of detecting the UE moves into or moves out of a reserved region for the small eNB. The controller 1920 performs measurement according to the settings of the measurement report setup message and transmits the measurement result to the macro eNB or the small eNB.

According to the present invention described above, the inter-cell load balancing and the inter-cell interference coordination are capable of increasing the wireless resource efficiency of network in a mobile communication system of an HetNet where macro eNBs and small eNBs coexist. In addition, the inter-cell load balancing and the inter-cell interference coordination are capable of adaptively employing a load balancing state of a network.

The embodiments of the present invention described in the description and drawings are merely provided to assist in a comprehensive understanding of the invention and are not suggestive of limitation. Although embodiments of the invention have been described in detail above, it should be understood that many variations and modifications of the basic inventive concept herein described, which may be apparent to those skilled in the art, will still fall within the spirit and scope of the embodiments of the invention as defined in the appended claims.

The invention claimed is:

1. An inter-cell load balancing method of a first base station in a wireless communication system including the first base station and a second base station, the method comprising:
   receiving, from a terminal, an indication of whether the terminal supports a neighbor cell interference removal function;
   configuring a first reserved region for the first base station and the second base station in case that the terminal does not support the neighbor cell interference removal function;
   configuring a second reserved region for the first base station and the second base station in case that the terminal supports the neighbor cell interference removal function;
   determining a state of the terminal located in the first reserved region or the second reserved region; and
   performing a handover of the terminal from the first base station to the second base station based on the state of the terminal.

2. The method of claim 1, further comprising:
   determining whether load balancing needs to be performed at a preset period,
   wherein the performing of the handover of the terminal from the first base station to the second base station is further based on whether the load balancing needs to be performed.

3. The method of claim 2, wherein the determining of whether the load balancing needs to be performed is based on at least one of the following:
   a condition as to whether an inter-cell interference control function is activated,
   a condition as to whether an inter-cell interference control partner cell exists,
   an almost blank subframe (ABS) rate currently in use, or
   a condition whether the terminal in the first reserved region exists.

4. The method of claim 3, wherein, when determining that the load balancing needs to be performed, the method further comprises:
   requesting a measurement report from the terminal; and
   receiving a measurement report from the terminal, in response to the request.

5. The method of claim 4, wherein, when determining that the load balancing needs to be performed, the method further comprises:
   selecting one or more terminals that support the neighbor cell interference removal function, are currently served by the first base station, are located in the second reserved region, and whose load is less than or equal to a predefined threshold, and
   moving the selected one or more terminals from the first base station to the second base station.

6. The method of claim 4, wherein, when determining that the load balancing needs to be performed, the method further comprises:
   selecting an interfering terminal from among one or more terminals that support the neighbor cell interference removal function, when the interfering terminal is currently served by the first base station, is located in the second reserved region, and has the highest reference signal received power (RSRP) from the second base station, and
   moving the interfering terminal from the first base station to the second base station.

7. The method of claim 1,
   wherein, when the first base station is a macro base station, the second base station is a small base station, or
   wherein, when the first base station is a small base station, the second base station is a macro base station.

8. The method of claim 1, further comprising:
   transmitting, to the terminal, a measurement report setup message which is set to perform the measurement report by the terminal when moving into or out of the second reserved region, when the terminal supports the neighbor cell interference removal function.

9. The method of claim 1, further comprising:
receiving a measurement report from another terminal that moves into the first reserved region; and
managing the other terminal that moves into the first reserved region based on whether the other terminal supports the neighbor cell interference removal function.

10. The method of claim 1, further comprising:
receiving a measurement report from another terminal that moves out of the first reserved region; and
managing the other terminal that moves out of the first reserved region based on whether the other terminal supports the neighbor cell interference removal function.

11. A first base station for balancing load between cells in a wireless communication system including the first base station and a second base station, the first base station comprising:
a transceiver; and
a controller configured to:
receive, from a terminal, an indication of whether the terminal supports a neighbor cell interference removal function,
configure a first reserved region for the first base station and the second base station in case that the terminal does not support a neighbor cell interference removal function,
configure a second reserved region for the first base station and the second base station in case that the terminal supports the neighbor cell interference removal function,
determine a state of the terminal located in the first reserved region or the second reserved region, and
perform a handover of the terminal from the first base station to the second base station based on the state of the terminal.

12. The first base station of claim 11,
wherein the controller is further configured to:
determine whether load balancing needs to be performed at a preset period,
wherein the performing of the handover of the terminal from the first base station to the second base station is further based on whether the load balancing needs to be performed, and
wherein the controller is further configured to determine whether the load balancing needs to be performed based on at least one of the following:
a condition as to whether an inter-cell interference control function is activated,
a condition as to whether an inter-cell interference control partner cell exists,
an almost blank subframe (ABS) rate currently in use, or
a condition whether the terminal in the first reserved region exists.

13. A measurement reporting method of a terminal in a wireless communication system including first and second base stations, the method comprising:
transmitting, to the first base station, an indication of whether the terminal supports a neighbor cell interference removal function;
receiving a measurement report setup message from the first base station;
detecting whether the terminal moves into or out of a first reserved region or a second reserved region, wherein the first reserved region is configured in case that the terminal does not support the neighbor cell interference removal function, and wherein the second reserved region is configured in case that the terminal supports the neighbor cell interference removal function; and
transmitting a measurement report to the first base station according to the settings of the measurement report setup message,
wherein the first base station determines whether to perform a handover of the terminal from the first base station to the second base station based on a state of the terminal located in the reserved region.

14. The method of claim 13, further comprising:
when receiving a handover message from the first base station, performing the handover to the second base station.

15. A terminal for performing a measurement report in a wireless communication system including first and second base stations, the terminal comprising:
a transceiver; and
a controller configured to:
transmit, to the first base station, an indication of whether the terminal supports a neighbor cell interference removal function,
receive a measurement report setup message from the first base station,
detect whether the terminal moves into or out of a first reserved region or a second reserved region, wherein the first reserved region is configured in case that the terminal does not support the neighbor cell interference removal function, and wherein the second reserved region is configured in case that the terminal supports the neighbor cell interference removal function of the terminal, and
transmit a measurement report to the first base station according to the settings of the measurement report setup message,
wherein the first base station determines whether to perform a handover of the terminal from the first base station to the second base station based on a state of the terminal located in the reserved region.

* * * * *